United States Patent
Hasegawa et al.

(10) Patent No.: US 7,143,858 B2
(45) Date of Patent: Dec. 5, 2006

(54) TRANSMISSION FOR A WORKING VEHICLE AND VEHICLE

(76) Inventors: Toshiyuki Hasegawa, Kanzaki Kokyukoki Mfg. Co., Ltd., 18-1, Inadera 2-Chome, Amagasaki-shi (JP) 661-0981; Norihiro Ishii, Kanzaki Kokyukoki Mfg. Co., Ltd., 18-1 Inadera 2-Chome, Amagasaki-shi (JP) 661-0981; Shigenori Sakikawa, Kanzaki Kokyukoki Mfg. Co., Ltd., 18-1 Inadera 2-Chome, Amagasaki-shi (JP) 661-0981

( * ) Notice: Subject to any disclaimer, the term of this patent is extended or adjusted under 35 U.S.C. 154(b) by 0 days.

(21) Appl. No.: 11/071,735

(22) Filed: Mar. 4, 2005

(65) Prior Publication Data

US 2005/0145432 A1 Jul. 7, 2005

Related U.S. Application Data

(63) Continuation of application No. 10/268,676, filed on Oct. 11, 2002, now Pat. No. 6,877,580.

(30) Foreign Application Priority Data

Oct. 12, 2001 (JP) ............................. 2001-315929
Oct. 12, 2001 (JP) ............................. 2001-315942

(51) Int. Cl.
*B60K 17/28* (2006.01)

(52) U.S. Cl. ...................... 180/292; 180/365; 180/367; 180/307

(58) Field of Classification Search ................ 180/364, 180/365, 367, 374, 376, 377, 381, 58, 292, 180/305, 306, 307; 74/730.1

See application file for complete search history.

(56) References Cited

U.S. PATENT DOCUMENTS

| 4,356,878 | A | * | 11/1982 | Kestian et al. | ............... 180/235 |
| 4,448,279 | A | * | 5/1984 | Watanabe et al. | ............ 180/297 |
| 6,250,414 | B1 | * | 6/2001 | Sato et al. | .................. 180/307 |
| 6,361,463 | B1 | * | 3/2002 | Kojima | ........................ 475/79 |
| 6,514,031 | B1 | * | 2/2003 | Cook | .......................... 414/685 |

(Continued)

FOREIGN PATENT DOCUMENTS

JP        55-104519        1/1954

(Continued)

*Primary Examiner*—Christopher P. Ellis
*Assistant Examiner*—Brian Swenson
(74) *Attorney, Agent, or Firm*—Sterne, Kessler, Goldstein & Fox P.L.L.C.

(57) ABSTRACT

A transmission for a working vehicle for transmitting drive power from an engine to a driving axle that includes: a flywheel including a flywheel body operatively connected with the engine and a flywheel housing for accommodating the flywheel body; a main-speed-change unit including a main-input shaft operatively connected with the engine via the flywheel body and a main-output shaft for outputting drive power to be transmitted to the driving axle; and a sub-speed-change unit including a sub-input shaft and a sub-output shaft, and disposed at a distance from the main-speed-change unit. The engine, the flywheel and the main-speed-change unit are integrally connected with each other so as to vibrate freely relative to a vehicle frame, and the main-output shaft of the main-speed-change unit is operatively coupled with the sub-input shaft of the sub-speed-change unit via a vibration-absorbing shaft coupling.

4 Claims, 22 Drawing Sheets

U.S. PATENT DOCUMENTS 6,601,474 B1 * 8/2003 Ishimaru et al. ....... 74/665 GA
6,637,294 B1 * 10/2003 Nemoto ..................... 74/730.1
6,742,619 B1 * 6/2004 Farbotnik et al. ........... 180/312
6,758,301 B1 * 7/2004 Shiba et al. ................ 180/383

FOREIGN PATENT DOCUMENTS

| JP | 4-91515 | 8/1992 |
| JP | 04-283130 | 10/1992 |
| JP | 10-339365 | 12/1998 |

* cited by examiner

TRANSMISSION FOR A WORKING VEHICLE AND VEHICLE

FIELD OF THE INVENTION

The present invention relates to a transmission for a working vehicle that is designed to transmit drive power from an engine to a driving axle. The present invention also relates to a vehicle with a power transmission train designed to transmit drive power from an engine to a driving axle via a main-speed-change unit and a sub-speed-change unit.

BACKGROUND ART

A vehicle such as a working vehicle has a power transmission train, which is designed to transmit drive power from an engine to a driving axle via a speed change unit, enabling the driving axle to be rotated at a predetermined speed by the operation of the speed change unit. If a need exists to widen a speed change range of the driving axle, and/or reduce the load applied to the speed change unit, a sub-speed-change unit is further provided in addition to a main-speed-change unit.

FIG. 22 is a model view of a conventional vehicle equipped with a main-speed-change unit and a sub-speed-change unit, in which a rear axle serves as a driving axle. As illustrated in this Figure, the conventional vehicle equipped with the sub-speed-change unit has engine 801, flywheel 802, main-speed-change unit 803, sub-speed-change unit 804 and driving axle unit 805, which are detachable from each other, aligned in sequence from one side of a vehicle to the opposite side thereof in the longitudinal direction and connected in tandem. This particular arrangement may cause the following problems.

That is, when a hydrostatic transmission (hereinafter referred to as HST) is used as the main-speed-change unit 803, the HST itself vibrates due to pulsation or the like of operating fluid pressure circulating in the HST. As mentioned above, the arrangement with the main-speed-change unit 803, the sub-speed-change unit 804 and the axle unit 805 connected to each other cause vibrations of the HST to be transmitted to vehicle frame 800 via the sub-speed-change unit 804 and the axle unit 805, thereby causing the problem of deteriorating driving conditions.

In order to solve the above problem, there was proposed an arrangement wherein the engine is connected with the sub-speed-change unit through a housing, and the HST serving as the main-speed-change unit, is connected with the front side of the sub-speed-change unit via an antivibration member. The front side of the FIST is then connected with the housing via another antivibration member.

However, in the above arrangement, there is no consideration made for vibration of the engine. That is, the above power transmission arrangement causes a problem wherein the housing itself, which supports the HST with a flexible structure omitting transmission of vibrations, vibrates due to vibrations transmitted from the engine.

In the above arrangement, the engine, the housing and the sub-speed-hange unit are connected in tandem, with the result that a space does not exist between front and rear wheels. Accordingly, a driver's step must be disposed above those members connected together, which necessitates the driver's step to be disposed at a higher place, and/or those connected members to be disposed at a higher place in a case where a mid-mount mower must be mounted between the front and rear wheels, hence inviting rise of the vehicle's center of gravity.

The present invention has been conceived in consideration of those prior arts. It is an object of the present invention to provide a transmission for a working vehicle with a power transmission train designed to transmit drive power from an engine to a driving axle via a main-speed-change unit and a sub-speed-change unit, which is capable of effectively preventing vibrations due to the engine and the main-speed-change unit from transmitting to the vehicle frame.

It is another object of the present invention to provide a transmission for a working vehicle that is capable of securing a free space between the front and rear wheels without inviting expansion of the vehicle's length.

It is still another object of the present invention to provide a vehicle with a power transmission train designed to transmit drive power from an engine to a driving axle via a main-speed-change unit and a sub-speed-change unit, which is capable of effectively preventing expansion of the vehicle's length, as well as securing a free space between the front and rear wheels.

BRIEF SUMMARY OF THE INVENTION

In order to achieve the above objects, there is provided a transmission for a working vehicle for transmitting drive power from an engine to a driving axle that includes: a flywheel including a flywheel body operatively connected with the engine and a flywheel housing for accommodating the flywheel body; a main-peed-change unit including a main-input shaft operatively connected with the engine via the flywheel body and a main-output shaft for outputting drive power to be transmitted to the driving axle; and a sub-speed-change unit including a sub-input shaft and a sub-output shaft, and disposed with a distance from the main-peed-change unit. The engine, the flywheel and the main-speed-change unit are integrally connected with each other so as to vibrate freely relative to a vehicle frame, and the main-output shaft of the main-speed-change unit is operatively coupled with the sub-input shaft of the sub-speed-change unit via a vibration-absorbing shaft coupling.

With the transmission having the above arrangement, vibrations due to the engine and the main-speed-change unit are effectively prevented from transmitting to the vehicle frame, thus contributing to improved running performance and running stability of the vehicle. Also, the arrangement with the main-speed-change unit, which vibrates freely relative to the sub-speed-change unit, being disposed independently at a distance from the sub-speed-change unit in the creation of a free space between the main- and sub-speed-change units. This provides an improved design flexibility in designing the working vehicle.

The transmission preferably further includes a damper interposed between the flywheel body and the main-input shaft. With this arrangement, variations in angular speed of the engine are effectively prevented from affecting on the main-input shaft of the main-speed-change unit, thereby improving reliability and durability of the drive train on the downstream side.

Preferably, the main-input shaft and the main-output shaft of the main-speed-change unit are aligned parallel to each other in the vehicle's vertical direction, that is, one above the other as seen in FIG. 7, and offset to each other in the vehicle's lateral direction. This arrangement can effectively limit the height of the main-speed-change unit, while shortening the width thereof.

The main-speed-change unit preferably includes an output adjusting member for adjusting the speed change ratio of the main-output shaft with respect to the main-input shaft, and the output adjusting member is operated by means of electric signals. This arrangement can achieve simplified coupling mechanism between the output adjusting member and the operation member disposed in the vicinity of the driver seat.

Preferably, the flywheel housing includes a body portion having an accommodation space and opposite open ends, and a partition wall for dividing the accommodation space into a first chamber for accommodating the flywheel body and a second chamber for accommodating the main-speed-change unit; and the flywheel body has a portion facing the partition wall, on which an airflow fan is provided.

According to another aspect of the present invention, there is provided a transmission for a working vehicle for transmitting drive power from an engine to a driving axle via a flywheel, an HST and a sub-speed-change unit, which are aligned in a power transmission direction. The flywheel includes a flywheel body operatively connected with the engine and a flywheel housing for accommodating the flywheel body. The HST includes a hydraulic pump unit having a pump shaft serving as a main-input shaft operatively connected with the engine via the flywheel body, a hydraulic motor unit having a motor shaft serving as a main-output shaft and outputting drive power through the motor shaft with the speed of the drive power non-stepwisely changed in cooperation with the hydraulic pump unit, and a center section for supporting the hydraulic pump unit and the hydraulic motor unit and provides fluid connection therebetween. The engine, the flywheel housing and the HST are integrally connected with each other so as to vibrate freely relative to the vehicle frame and disposed at a distance from the sub-speed-change unit. The sub-speed-change unit includes a sub-input shaft and a sub-output shaft. The motor shaft of the HST is operatively coupled with the sub-input shaft of the sub-speed-change unit via a vibration-absorbing shaft coupling.

With the transmission having the above arrangement, vibrations due to the engine and the HST are effectively prevented from transmitting to the vehicle frame, thus contributing to improved running performance and running stability of the vehicle. Also, the arrangement with the HST, which vibrates freely relative to the sub-speed-change unit, being disposed independently at a distance from the sub-speed-change unit, results in the creation of a free space between the HST and the sub-speed-change unit. This provides improved design flexibility in designing the working vehicle.

Preferably, the flywheel housing includes a body portion having an accommodation space and opposite open ends, and a partition wall for dividing the accommodation space into a dry chamber for accommodating the flywheel body and a hydraulic fluid chamber for accommodating the HST, and the flywheel body has a portion facing the partition wall, on which an airflow fan is provided.

Preferably, one of the opposite open ends of the flywheel housing, which is located closer to the hydraulic fluid chamber, is covered by the center section.

Preferably, the hydraulic pump unit and the hydraulic motor unit are supported on an upstream side of the center section; the pump shaft of the hydraulic pump unit has a downstream end extending downstream through a downstream side of the center section; and the downstream end of the pump shaft is provided with a charge pump for replenishing operating fluid in the HST.

Preferably, the downstream end of the pump shaft is further provided with an auxiliary pump for feeding operating fluid to an outside actuator.

Preferably, the hydraulic pump unit and the hydraulic motor unit are respectively supported on upstream and downstream sides of the center section; and the upstream end of the pump shaft in the hydraulic pump unit has a portion located in the dry chamber, the portion being provided with a charge pump for replenishing operating fluid in the HST.

Preferably, a downstream end of the pump shaft extends downstream through the center section; and a housing for accommodating the sub-speed-change unit is further provided, in which the housing includes a power transmission shaft operatively coupled with the downstream end of the pump shaft via a vibration-absorbing shaft coupling, and an auxiliary pump for feeding operating fluid to an outside actuator, which is driven by drive power branched from the power transmission shaft.

The flywheel housing preferably includes a PTO shaft, to which drive power from the engine is selectively transmitted by engagement and disengagement of clutch means.

The main-output shaft and the PTO shaft are preferably aligned parallel to each other in a vehicle's lateral direction.

According to still another aspect of the present invention, there is provided a vehicle with a power transmission train for transmitting drive power from an engine, which is disposed on a vehicle frame closer to a first side thereof in a fore and aft direction of the vehicle, to a driving axle via a main-speed-change unit and a sub-speed-change unit. The main-speed-change unit is integrally disposed with a flywheel housing that is connected with the downstream side of the engine. The sub-speed-change unit is disposed on the vehicle frame closer to a second side thereof in the fore and aft direction of the vehicle at a distance from the flywheel housing. The main-speed-change unit is operatively coupled with the sub-speed-change unit via a coupling shaft that extends in the fore and aft direction of the vehicle.

The above arrangement can effectively limit the length of the vehicle, while securing a free space between the front and rear wheels so as to produce improved design flexibility in designing the vehicle. For example, by the utilization of the free space, a driver's step and/or a mid-mount mower can be disposed at lower places.

Preferably, the flywheel housing includes a body portion having an accommodation space and opposite open ends, and a partition wall for dividing the accommodation space into a first chamber and a second chamber, the former located closer to the first side of the vehicle in the fore and aft direction, and the latter located closer to the second side of the vehicle in the fore and aft direction, in which the first chamber accommodates a flywheel body of the flywheel and the second chamber accommodates the main-speed-change unit.

The flywheel body preferably has a portion facing the partition wall, on which an airflow fan is provided.

Preferably, the engine, the flywheel and the main-speed-change unit are mounted on the vehicle frame so as to vibrate relative to the vehicle frame, and the sub-speed-change unit is mounted on the vehicle frame so as not to vibrate relative to the vehicle frame; and the main-speed-change unit is operatively coupled with the sub-speed-change unit via a vibration-absorbing shaft coupling. This arrangement can effectively prevent vibrations due to the engine or the like from transmitting to the vehicle frame and the sub-speed-change unit, while securely achieving power transmission between the main-speed-change unit and the sub-speed-change unit.

According to yet another aspect of the present invention, there is provided a vehicle with a power transmission train for transmitting drive power from an engine, which is disposed on a vehicle frame closer to a first side thereof in a fore and aft direction of the vehicle, to a driving axle via a flywheel, an HST and a sub-speed-change unit. The flywheel housing includes a flywheel body operatively connected with the engine and a flywheel housing connected with a side of the engine facing a second side of the vehicle frame in the fore and aft direction of the vehicle so as to accommodate the flywheel body. The HST is integrally disposed with the flywheel housing. The sub-speed-change unit is disposed on the vehicle frame closer to the second side in the fore and aft direction of the vehicle at a distance from the flywheel housing. The HST is operatively coupled with the sub-speed-change unit via a coupling shaft that extends in the fore and aft direction of the vehicle.

The above arrangement can effectively limit the length of the vehicle, while securing a free space between the front and rear wheels so as to produce improved design flexibility in designing the vehicle. For example, by the utilization of the free space, a driver's step and/or a mid-mount mower can be disposed at lower places.

Preferably, the engine, the flywheel and the HST are mounted on the vehicle frame so as to vibrate relative to the vehicle frame, and the sub-speed-change unit is mounted on the vehicle frame so as not to vibrate relative to the vehicle frame; and the HST is operatively coupled with the sub-speed-change unit via a vibration-absorbing shaft coupling. This arrangement can effectively prevent vibrations due to the engine, the HST and the like from transmitting to the vehicle frame and the sub-speed-change unit, while enabling secured power transmission between the HST and the sub-speed-change unit.

Preferably, the flywheel housing is provided with a PTO shaft capable of transmitting drive power from the engine to the outside of the flywheel housing via clutch means.

BRIEF DESCRIPTION OF THE DRAWINGS/FIGURES

The above, and other objects, features and advantages of the present invention will become apparent from the detailed description thereof in conjunction with the accompanying drawings wherein.

DETAILED DESCRIPTION OF THE INVENTION

First Embodiment

Figure 1:
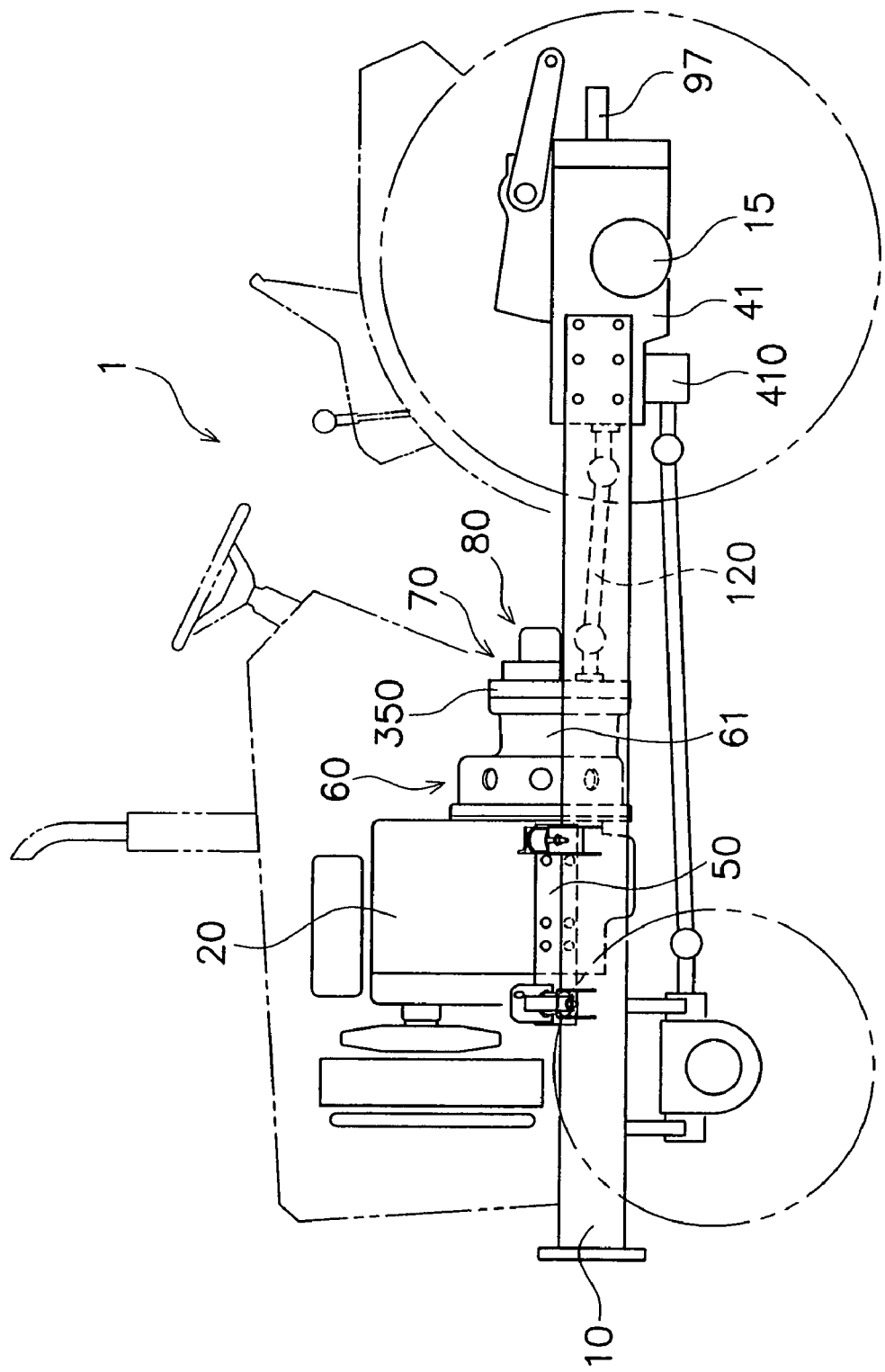
FIG. 1 is a schematic side view of a working vehicle according to a first embodiment of the present invention.
Figure 2:
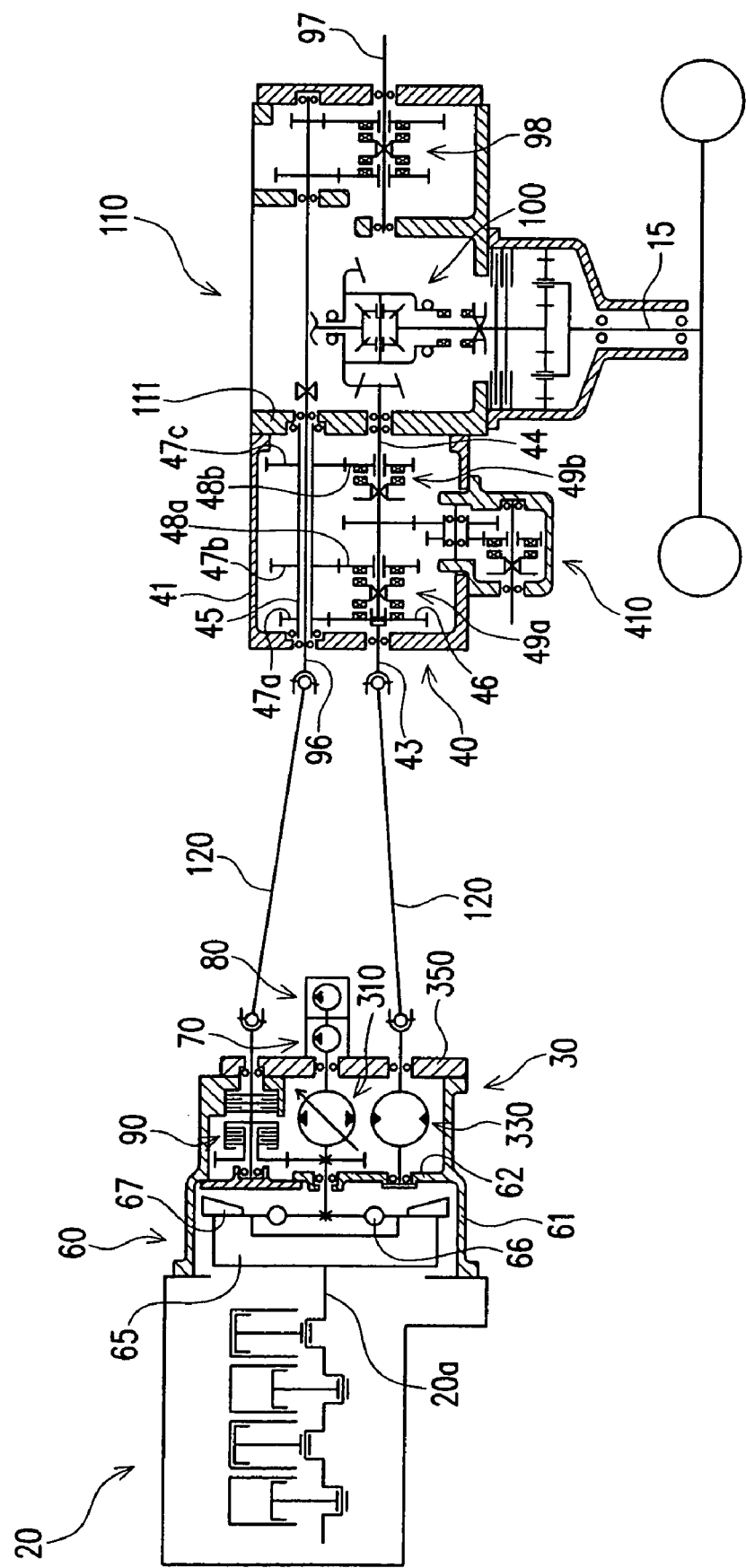
FIG. 2 is a model view illustrating power transmission of the working vehicle of FIG. 1.

The description will be made for a preferred embodiment of the present invention with reference to the accompanied drawings. FIGS. 1 and 2 are respectively a schematic side view of working vehicle I of this embodiment and a model view illustrating power transmission of the vehicle.

As illustrated in FIGS. 1 and 2, the working vehicle 1 includes vehicle frame 10, engine 20 flexibly supported with a vibration absorption structure on the vehicle frame 10 closer to a first side thereof with respect to a fore and aft direction of the vehicle, a main-speed-change unit and a sub-speed-change unit for respectively performing transmission of drive power from the engine while changing the speed thereof so that running power is transmitted through the sub-speed-change unit to driving wheels.

Figure 3:
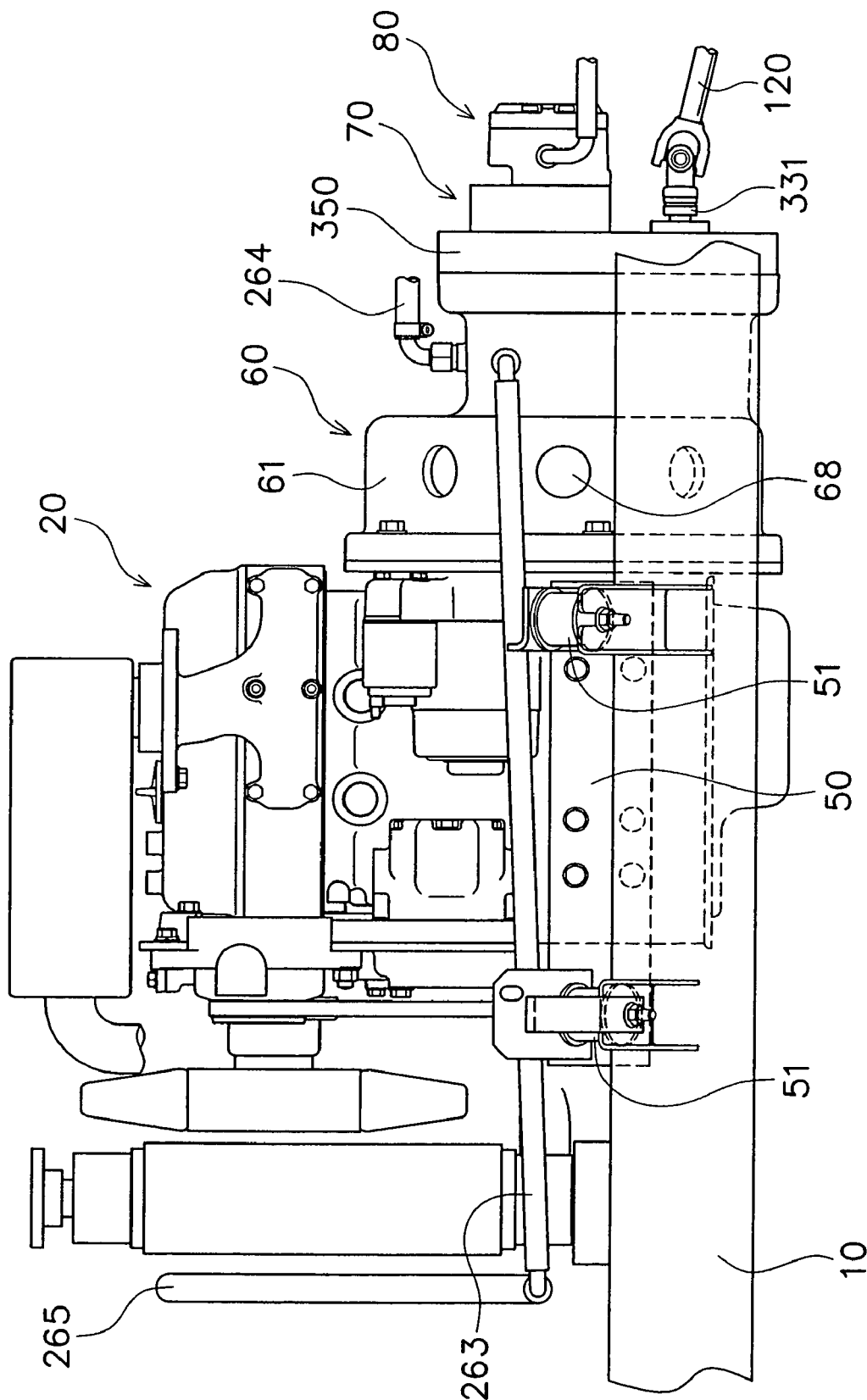
FIG. 3 is an enlarged side view of an engine and its vicinity in the vehicle of FIG. 1.
Figure 4:
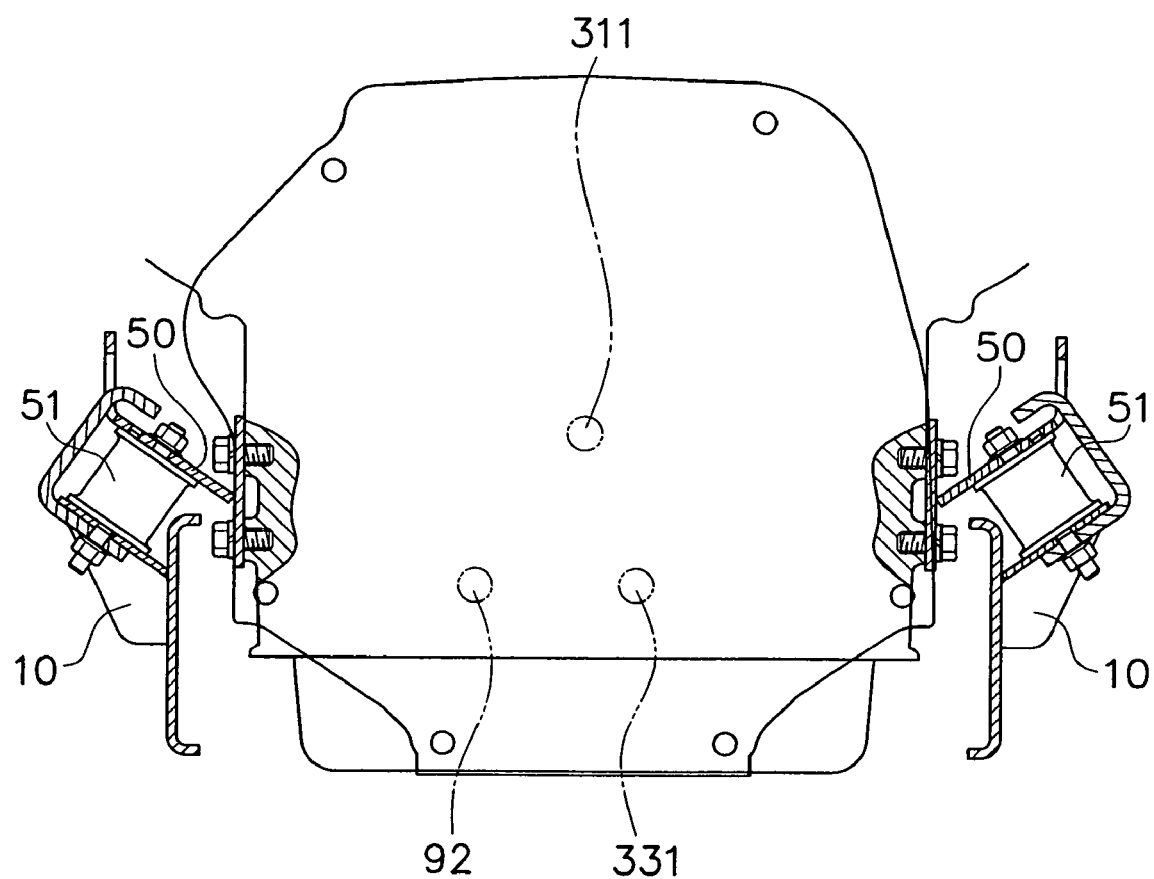
FIG. 4 is a schematic front view of the engine of FIG. 3.

FIG. 3 is an enlarged side view of the engine and its vicinity. FIG. 4 is a schematic front view of the engine.

As illustrated in FIGS. 3 and 4, attaching bracket 50, which is connected with the vehicle frame via antivibration rubber 51, is securely threaded on lateral side walls of the engine 20. That is, the engine can vibrate freely relative to the vehicle frame 10 so that vibrations from the engine 20 are prevented from transmitting to the vehicle frame 10.

The working vehicle is constructed so that drive power from the engine 20 is transmitted to the main-speed-change unit via flywheel 60. That is, in the working vehicle, the flywheel 60, the main-speed-change unit and the sub-speed-change unit together constitute a transmission for transmitting drive power from the engine to a driving axle.

The flywheel 60 and the main-speed-change unit are connected and supported by the engine 20 and/or the attaching bracket 50 in a free state (with no direct engagement) with respect to the vehicle frame 10. That is, the engine 20, 91 the flywheel 60 and the main-speed-change unit are integrally connected with each other, thereby constituting a vibratory unit, which can vibrate freely relative to the vehicle frame 10.

Figure 5:
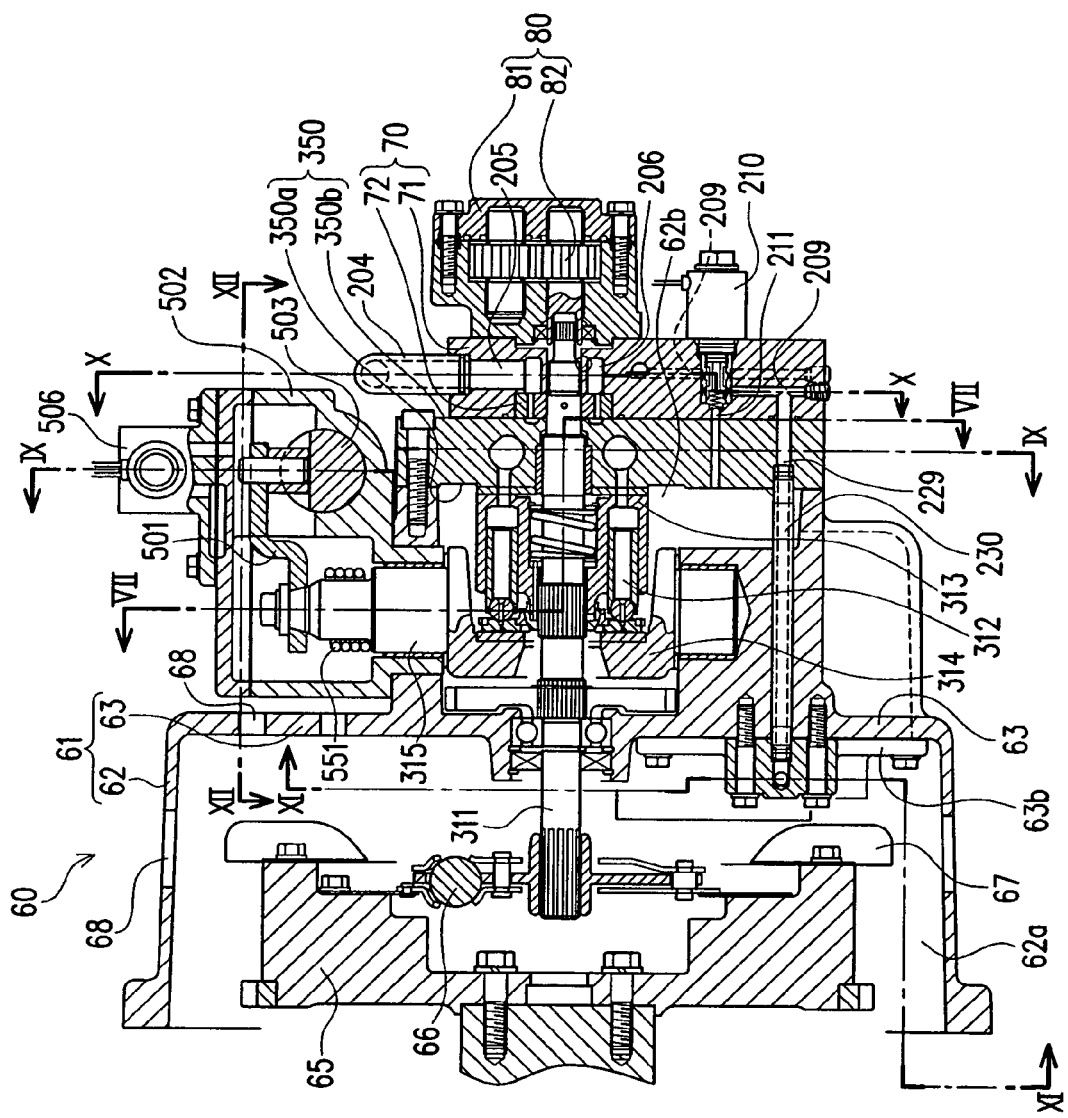
FIG. 5 is a front view of a flywheel, an HST and its vicinity in lateral cross section in the working vehicle of FIG. 1.
Figure 6:
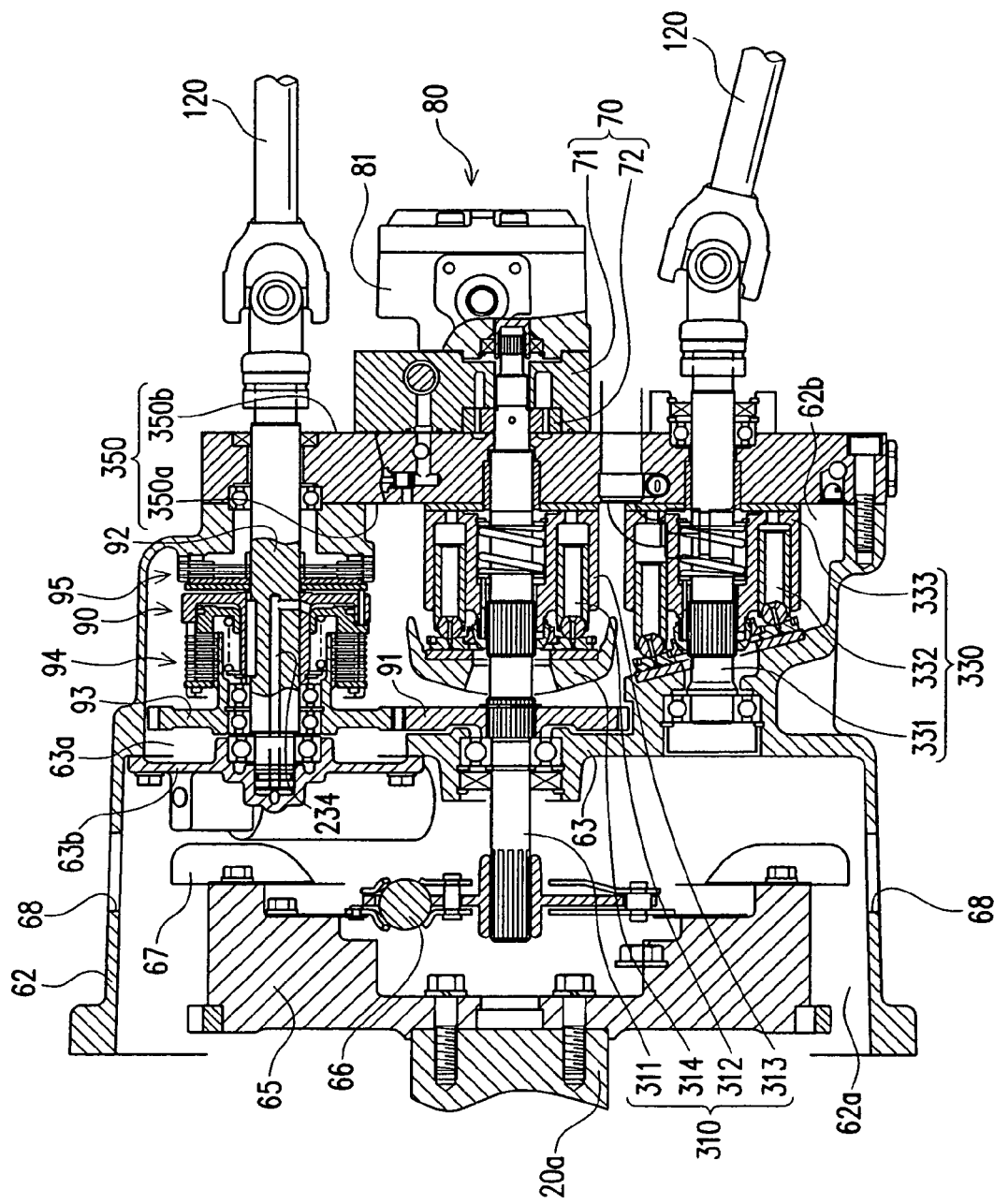
FIG. 6 is a side view of the flywheel and the HST of FIG. 5 in longitudinal cross section.

FIGS. 5 and 6 are respectively a laterally section plan view and a longitudinally section side view of the flywheel 60, main-speed-change unit 30 and its vicinity.

As illustrated in FIGS. 5 and 6, the flywheel 60 includes flywheel housing 61 that is connected with the engine 20 and/or the attaching bracket 50 in a free state (i.e., without direct engagement) with respect to the vehicle frame 10, and flywheel body 65 accommodated within the housing 61 so as to be operatively connected with crankshaft 20a of the engine 20.

The flywheel 60 is preferably provided with damper 66 that is connected with an output portion of the flywheel body 65, thereby enabling the power transmission to the main-speed-change unit of the downstream side while limiting variation in angular speed of the output of the engine, As illustrated in FIGS. 5 and 6, the flywheel housing 61 has body 62 of a substantially tubular shape that has opposite open ends (upstream open end and downstream open end) in a power transmission direction, and partition wall 63 that divides an inner space of the tubular body 62 into first chamber 62a and second chamber 62b respectively located on the upstream and downstream sides in the power transmission direction. As used throughout the description, the directional term "upstream" and "downstream" are relative to the power transmission direction.

The first chamber 62a is designed as a dry chamber for accommodating the flywheel body 65 and the damper 66. On the other hand, the second chamber 62b is designed as a hydraulic fluid chamber for accommodating HST 30 serving as the main-speed-change unit and storing operating fluid used for it.

The flywheel body 65 has a side facing the partition wall 63, which is preferably provided with airflow fan 67, which draws outside air into the first chamber 62a of the flywheel housing 61, thereby cooling the main-speed-change it and hence providing effective preventive measure against temperature rise of operating fluid in the hydraulic fluid chamber by means of a simple structure of the fan, which utilizes rotation of the flywheel body 65. In FIGS. 5 and 6, reference numeral 68 represents a vent hole formed in a peripheral wall of the tubular body 62.

The HST 30 includes hydraulic pump unit 310 for receiving drive power from the engine 20 via the flywheel 60, hydraulic motor unit 330 for non-stepwisely changing the speed of drive power from the engine 20 in cooperation with the hydraulic pump unit 310, and center section 350 that supports the hydraulic pump unit 310 and the hydraulic motor unit 330, and forms a hydraulic circuit for fluid connection therebetween. In this embodiment, the center section 350 is provided with a pair of hydraulic lines as the hydraulic circuit, which will be described later.

At least one of the hydraulic pump unit 310 and the hydraulic motor unit 330 is of a variable displacement type that has suction/discharge rates variable by the operation of an output adjusting member, which can non-stepwisely change the speed of the output from the hydraulic motor unit 330 by the control of the slanting angle of the output adjusting member. In this embodiment, the hydraulic pump unit 310 and the hydraulic motor unit 330 are respectively designated as being of the variable displacement type and a fixed displacement type.

The center section 350 has first side 350a and second side 350b, which respectively face upstream and downstream in the power transmission direction. With both the hydraulic pump unit 310 and the hydraulic motor unit 330 supported on the first side 350a, the center section 350 is connected with the tubular body 62 of the flywheel housing 61 so as to cover the downstream open end of the tubular body 62.

That is, in this embodiment, the center section 350 constitutes a part of the flywheel housing 61, and the center section 350, the tubular body 62 and the partition wall 63 together define the hydraulic fluid chamber (second chamber) 62b.

The hydraulic pump unit 310 is, as described above accommodated within the hydraulic fluid chamber 62b of the flywheel housing 61 while supported by the center section 350.

More specifically, the hydraulic pump unit 310 includes pump shaft 311 that has an upstream end extending into the dry chamber (first chamber) 62a through the partition wall 63 and coupled with the damper 66, and a downstream end extending to the outside through the center section 350, piston unit 312 that performs a rotational movement around the axis of the pump shaft 311 by the rotation of the pump shaft 311 and a reciprocal movement in association with the rotational movement, cylinder block 313 that supports the piston unit 312, allowing it to perform a reciprocal movement, and is supported on the first side 350a of the center section 350 so as to be in communication with the pair of hydraulic lines, output adjusting member 314 that regulates the stroke length of the piston unit 312 according to the slanting angle so as to vary the suction/discharge rates of the piston unit 312, and control shaft 315 (see the drawings) that adjusts the slanting angle of the output adjusting member 314.

In this embodiment, as illustrated in FIGS. 5 and 6, the hydraulic pump unit 310 is of an axial piston type, which employs a movable swash plate as the output adjusting member 314. In the case where the hydraulic pump unit is of a radial piston type, a cam ring is employed as the output adjusting member.

The hydraulic motor unit 330, which is designated as being of the fixed displacement type in this embodiment, includes cylinder block 333 that is supported on the first side 350a of the center section 350 so as to be in communication with the pair of hydraulic lines, piston unit 332 that is slidably supported within the cylinder block 333 and performs a rotational movement as well as a reciprocal movement by means of pressurized hydraulic fluid from the pair of hydraulic lines, and motor shaft 331 that rotates around the axis by the rotational movement of the piston unit 332 and has a downstream end extending to the outside (rearwards in this embodiment) through the center section 350. The thus arranged hydraulic motor unit 330 can output rotational output through the motor shaft 331 serving as a main output shaft, which output is variable according to the slanting angle of the output adjusting member 314 in the hydraulic pump unit 310.

The vehicle includes charge pump unit 70 driven through the downstream end of the pump shaft 311, as illustrated in FIGS. 5 and 6. The charge pump unit 70 is used to feed operating fluid to the HST 30, and/or feed operating fluid to a PTO unit, which will be later described.

Specifically, the charge pump unit 70 includes charge pump casing 71 supported on the second side 350b of the center section 350, and charge pump body 72 that is enclosed by the charge pump casing 71 and driven through the downstream end of the pump shaft 311.

The vehicle may be provided with auxiliary pump unit 80 for feeding operating fluid for driving an outside actuator and/or feeding operating fluid to a power steering mechanism. By providing the auxiliary pump unit 80 as well as the charge pump unit 70, it is possible to sufficiently provide operating fluid without applying excessive load to the charge pump unit 70.

The auxiliary pump unit 80 includes auxiliary pump casing 81 that is supported on a downstream side of the charge pump casing 71, and auxiliary pump body 82 that is enclosed within the auxiliary pump casing 81 and driven through the downstream end of the pump shaft 311.

The vehicle of this embodiment further includes PTO unit 90 for driving an outside unit such as a working unit. In this embodiment, the PTO unit 90 is accommodated within the hydraulic fluid chamber 62b of the flywheel housing 61.

Specifically, the PTO unit 90 includes PTO drive gear 91 that is relatively non-rotatably supported on the pump shaft 311 so as to be positioned within the hydraulic fluid chamber 62b, PTO shaft 92 that has opposite ends respectively bearing-supported by the partition wall 63 and the center section 350, enabling the PTO shaft 92 to be aligned parallel with the pump shaft 311 preferably in the vertical direction (i.e., at a different height from the pump shaft 311 while maintaining a parallel relationship therebetween), PTO driven gear 93 that is relatively rotatably supported on the PTO shaft 92 so as to be in meshed engagement with the PTO drive gear 91, and hydraulic clutch unit 94 that performs engagement/disengagement between the PTO driven gear 93 and the PTO shaft 92.

More specifically, the partition wall 63 of the flywheel housing 61 forms opening 63a through which the PTO unit 90 is insertable, and is also provided with a detachable lid member 63b that covers the opening 63a and supports the upstream end of the PTO shaft 92. The thus formed opening 63a of the partition wall 63 allows the PTO unit 90 to be placed into the hydraulic fluid chamber 62b through the dry chamber 62a.

The PTO shaft 92 has a downstream end extending to the outside through the center section 350 to have an outer extension through which drive power for the outside unit can be taken off.

The PTO unit 90 is preferably provided with brake unit 95 between the flywheel housing 61 and the PTO shaft 92 so as to apply braking force to the PTO shaft 92 in association with a power shutoff action of the hydraulic clutch unit 94 with respect to the PTO shaft 92. The thus provided brake unit 95 effectively prevents the PTO shaft 92 from rotating due to the moment of inertia of the outside unit coupled with the PTO shaft, after the power shutoff of PTO shaft 92.

Figure 7:
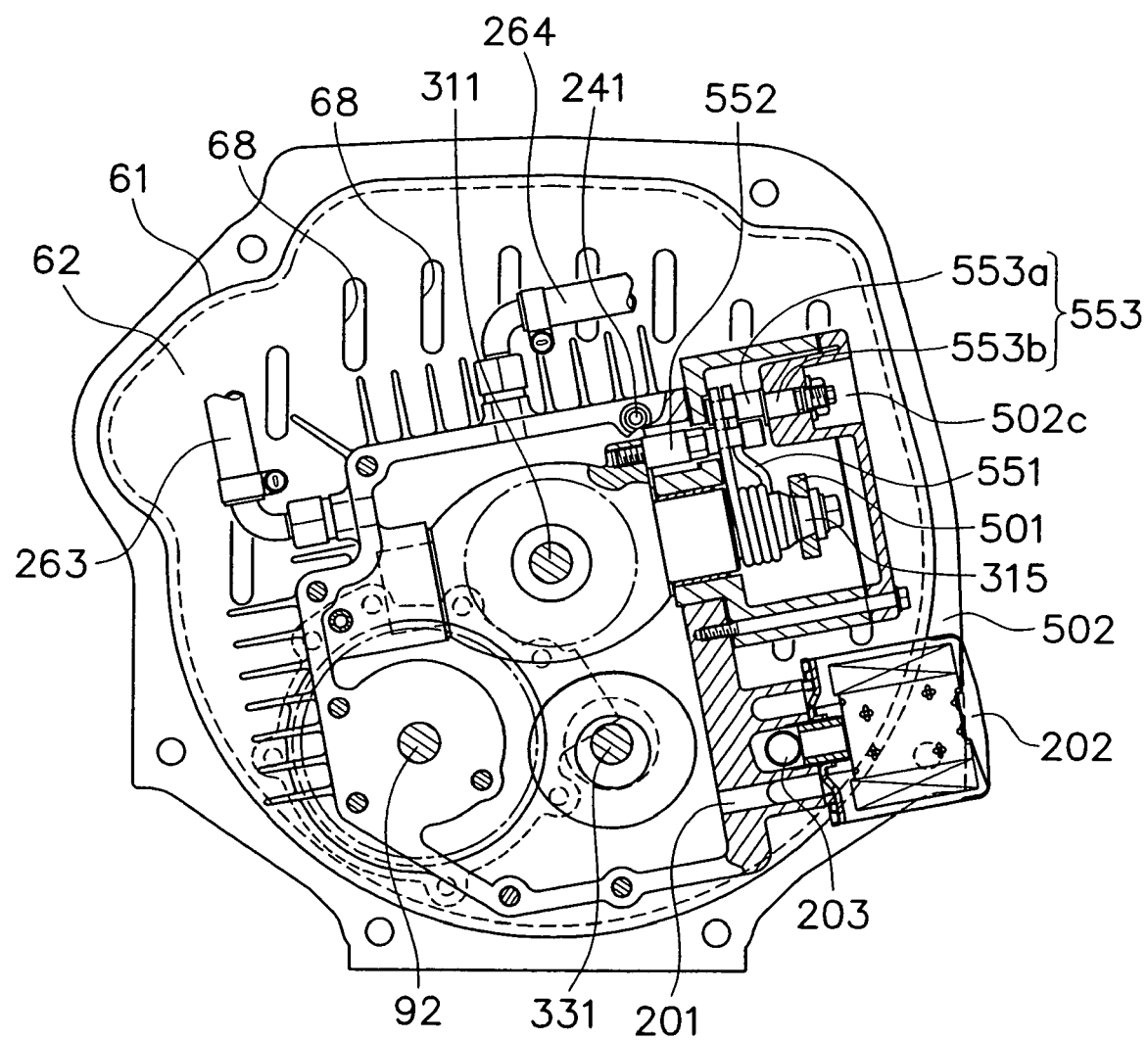
FIG. 7 is a cross section taken along a line VII—VII in FIG. 5.

FIG. 7 is a cross section taken along a line VII—VII in FIG. 5. As illustrated in this Figure, the HST has the pump shaft 311 and the motor shaft 331 aligned parallel to each other in the vehicle's vertical direction and offset to each other in a vehicle's lateral direction, thereby shortening the length of the HST in the vehicle's lateral direction while limiting a vertical space to be occupied by these shafts. Therefore, constitutional members of the vehicle to be disposed above the HST, such as a driver seat can be disposed as low as possible, thereby contributing to ease of getting-on/off the vehicle and/or creating a lowered center of gravity of the vehicle. With this shaft arrangement, the pump shaft 311, the motor shaft 331 and the PTO shaft 92 are arranged in a triangle as viewed from the front side, so that these shafts can be disposed as close as possible to each other within the flywheel housing 61. As a result, the size of a combination comprising the HST and the PTO unit can be minimized.

In this embodiment, multi-speed mechanical transmission 40 is provided to serve as the sub-speed-change unit.

The multi-speed mechanical transmission 40 is securely supported on the vehicle frame 10 closer to a second end thereof, with a distance from the HST 30 serving as the main-speed-change unit in the fore and aft direction of the vehicle. That is, on the contrary to the vibratory arrangement that the engine, the flywheel and the HST together constitute a vibratory unit, which can vibrate freely relative to the vehicle frame, the multi-speed mechanical transmission 40 constitutes a fixed unit, which is disposed with a distance from the vibratory unit in the fore and aft direction of the vehicle in such a manner as not to vibrate relative to the vehicle frame.

More specifically, as illustrated in FIGS. 1 and 2, the multi-speed mechanical transmission 40 includes transmission housing 41 and speed change unit 42 accommodated within the transmission housing 41. The transmission housing 41 is connected with housing 111 of axle unit 110 having differential gear unit 100 that branches drive power and transmits the same to a pair of main driving axles 15, and is disposed not to vibrate relative to the vehicle frame.

The speed change unit 42 includes sub-input shaft 43 operatively coupled with the motor shaft 331, and sub-output shaft 44 disposed so as to stepwisely change the speed between itself and the sub-input shaft 43. With this arrangement, drive power is transmitted from the sub-output shaft 44 to the differential gear unit 100.

The sub-input shaft 43 is coupled with the motor shaft 331 via vibration-absorbing shaft coupling 120, thereby enabling smooth transmission of drive power between the motor shaft 331 capable of vibrating freely relative to the vehicle frame 10 and the sub-input shaft 43 incapable of vibrating relative to the vehicle frame 10. As the vibration-absorbing shaft coupling 120, a transmission shaft with universal joints at its opposite ends can be used.

In this embodiment, as illustrated in FIG. 2, the speed change unit 42 includes the sub-input shaft 43, driven shaft 45 disposed substantially parallel with the sub-input shaft 43, the sub-output shaft 44 disposed coaxial with the sub-input shaft 43 so as to be rotatable relative to the same around the axis, drive gear 46 relatively non-rotatably supported on the sub-input shaft 43, first driven gear 47a relatively non-rotatably supported on the driven shaft 45 in meshed engagement with the drive gear 46, second and third driven gears 47b, 47c disposed with a distance from the driven gear 47a in the axial direction in such a manner as to be relatively non-rotatably supported on the driven shaft 45, first output gear 48a relatively rotatably supported on the sub-output shaft 44 in meshed engagement with the second driven gear 47b, second output gear 48b relatively rotatably supported on the sub-output shaft 44 in meshed engagement with the third driven gear 47c, first shifter unit 49a disposed between the sub-input shaft 43 and the sub-output shaft 44, and second shifter unit 49b disposed between the second output gear 48b and the sub-output shaft 44.

The first shifter unit 49a is designed to be capable of selectively taking a low speed position allowing the sub-output shaft 44 to be relatively non-rotatably coupled with the sub-input shaft 43 or the drive gear 46, a middle speed position allowing the first output gear 48a to be relatively non-rotatably coupled with the sub-output shaft 44, and a neutral position allowing the sub-output shaft 44 to be out of engagement with the sub-input shaft 43 or the drive gear 46 and with the first output gear 48a.

On the other hand, the second shifter unit 49b is designed to be capable of selectively taking a high speed position allowing the second output gear 48b to be relatively non-rotatably coupled with the sub-output shaft 44, and a neutral position allowing them to be disengaged from each other.

The thus arranged multi-speed mechanical transmission 40 is capable of producing drive power adjustable in three stages through the sub-output shaft 44 by the operation of the first and second shifter units 49a, 49b.

When employing the PTO unit 90 as in the working vehicle of this embodiment, the multi-speed mechanical transmission 40 is further provided with power transmission shaft 96 for transmitting drive power outputted from the PTO shaft 92 to the outside unit. The PTO shaft 92 is operatively coupled with vibration-absorbing shaft coupling 120 in the same as a coupling manner between the motor shaft 331 and the sub-input shaft 43.

When providing the power transmission shaft 96 in the multi-speed mechanical transmission 40, the driven shaft 45 is preferably formed in a hollow tubular shape to have an inner hollow space, into which the power transmission shaft 96 is relatively rotatably inserted. This arrangement can achieve downsizing of the multi-speed mechanical transmission 40 in an embodiment employing a PTO power transmission train.

Reference numerals 97 and 98 in FIG. 2 respectively represent a PTO output shaft, and a PTO speed change unit disposed between the power transmission shaft 96 and the PTO output shaft 97.

As illustrated in FIG. 2, the multi-speed mechanical transmission 40 is further provided with a four-wheel-drive unit 410 in this embodiment. The four-wheel-drive unit 410 may be designed to take off drive power through the sub-output shaft 44, allowing itself to easily take off drive power synchronized with the sub-output shaft 44, which outputs drive power for the main driving axles 15. The four-wheel-drive unit 410 is preferably mounted to the multi-speed mechanical transmission 40 in a detachable manner.

The thus arranged working vehicle produces the following desirable effects. In the working vehicle of this embodiment, which includes the vibratory unit that can vibrate freely relative to the vehicle frame, and the fixed unit that cannot vibrate relative to the vehicle frame 10, the former being constituted by the integral arrangement of the engine 20, the HST 30 serving as the main-speed-change unit and the flywheel 60, all of which cause vibrations to the vehicle frame 10, and the latter being constituted by the multi-speed mechanical transmission 40 serving as the sub-speed-change unit, which is disposed with a distance from the vibratory unit along the vehicle's longitudinal direction, in which the power transmission between the vibratory unit and the fixed unit (i.e., the power transmission between the pump shaft 311 of the HST 30 and the sub-input shaft 43 of the multi-speed mechanical transmission 40) is performed via the vibration-absorbing shaft coupling 120.

The thus arranged working vehicle can securely perform power transmission from the HST 30 to the multi-speed mechanical transmission 40, while effectively preventing vibrations of the engine and the HST itself due to pulsation or the like of operating fluid pressure in the HST from transmitting to the fixed unit. As a result, the driveability and stability of the vehicle can be remarkably improved.

Moreover, in the working vehicle of this embodiment, the engine 20, which is disposed closer to the first side of the vehicle in the fore and aft direction of the vehicle, has a side facing the second side (opposite to the first side with respect to the fore and aft direction of the vehicle), through which the flywheel housing 61 is connected with the engine 20. The thus connected flywheel housing 61 accommodates the HST 30 serving as the main-speed-change unit. On the other hand, the multi-speed mechanical transmission 40 serving as the sub-speed-change unit is connected with the axle unit disposed on the second side of the vehicle in the fore and aft direction of the vehicle with a distance from the HST 30, and is also coupled with the HST via their shafts.

That is, the working vehicle with the HST 30 accommodated within the flywheel housing 61 and the multi-speed mechanical transmission 40 connected with the axle unit can effectively limit the vehicle's length, while securing a free space between the HST 30 and the multi-speed mechanical transmission 40, thereby providing improved design flexibility in designing a vehicle.

Specifically, the above arrangement produces a design flexibility enabling such as a driver's step to be disposed above the free space, and/or a mid-mount mower to be disposed below the free space, thereby achieving lowered center of gravity of the vehicle, and improved running stability of the vehicle.

As described above, in this embodiment, in order to absorb relative vibrations between the HST 30, which serves as a part of the vibratory unit, and the multi-speed mechanical transmission 40, which serves as a part of the fixed unit, the coupling therebetween is made by the vibration-absorbing shaft coupling 120. Unless relative vibrations occur between the HST 30 and the multi-speed mechanical transmission 40, a coupling of a general type may be employed for the coupling therebetween.

The accommodation of the HST 30 within the flywheel housing 61 produces a desirable effect of lowering costs thanks to decrease in the number of parts resulted from this arrangement, as well as the above described effects. As another desirable effect, the arrangement with the downstream open end of the flywheel housing 61 covered by the center section 350, which enables the center section 350 to also serve a part of the flywheel housing 61, contributes to additional cost reduction.

The description will be hereinafter made for the hydraulic circuit of the working vehicle 1.

Figure 8:
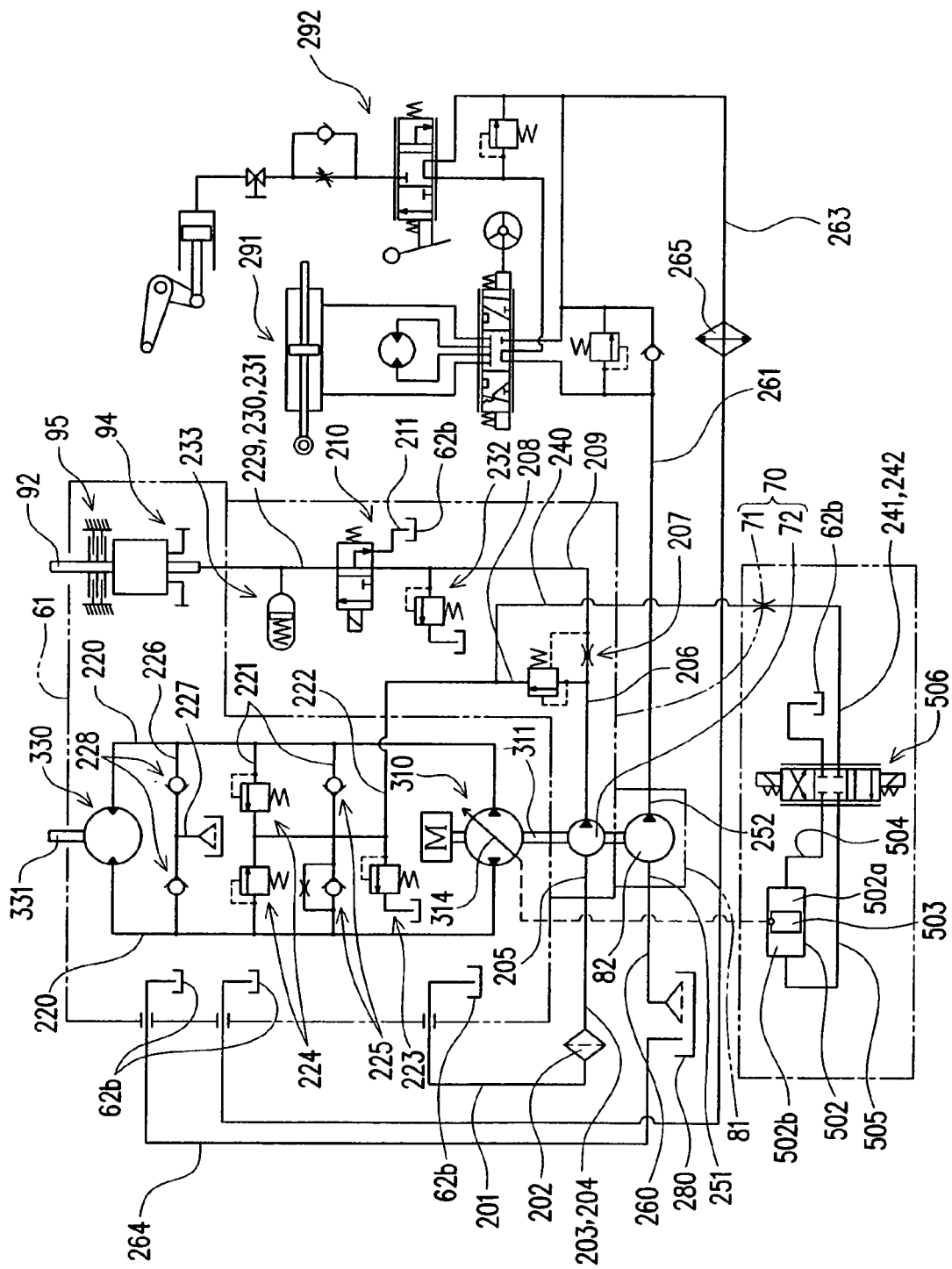
FIG. 8 is a hydraulic circuit diagram of the working vehicle of FIG. 1.
Figure 9:
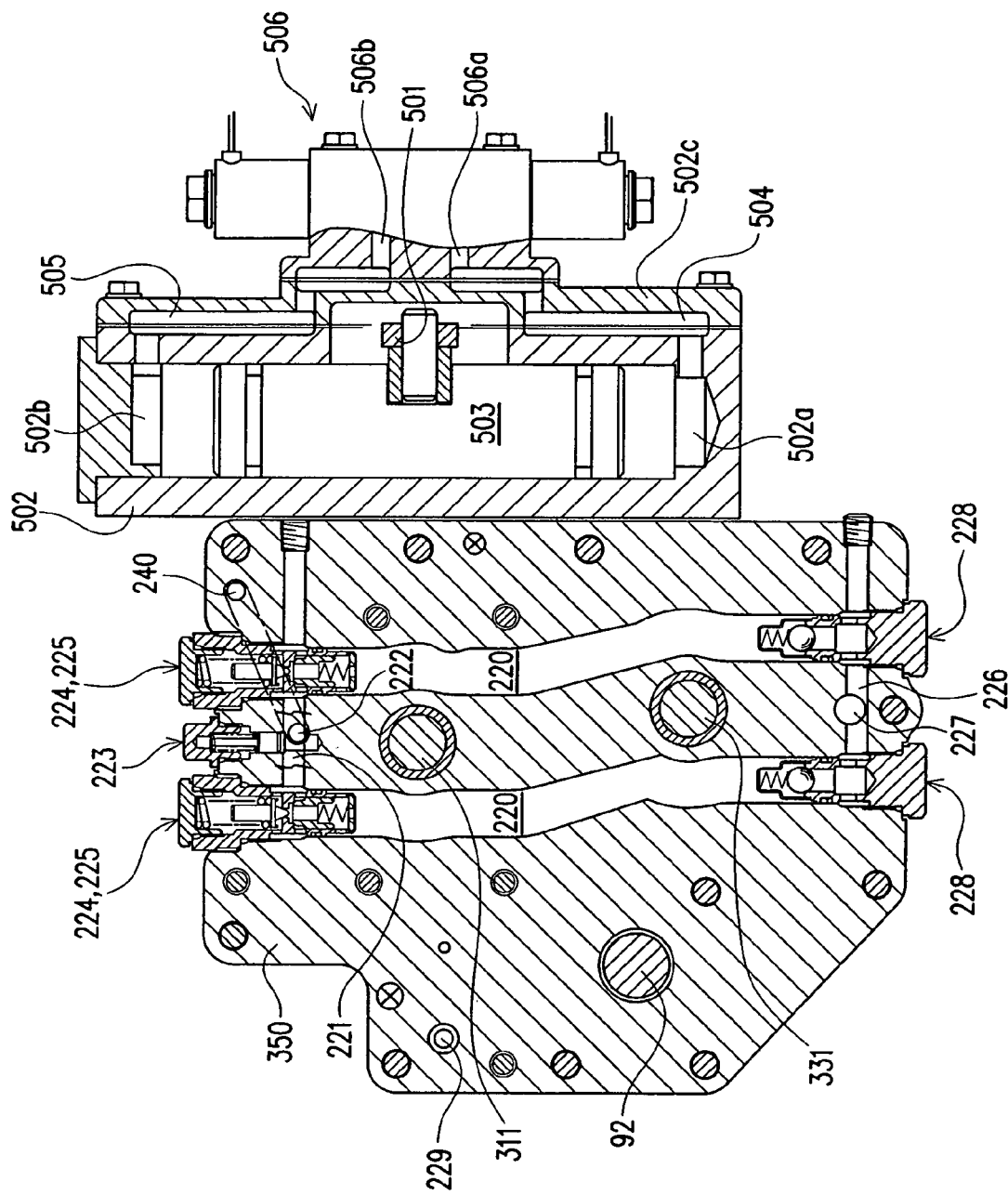
FIG. 9 is a cross section taken along a line IX—IX in FIG. 5.
Figure 10:
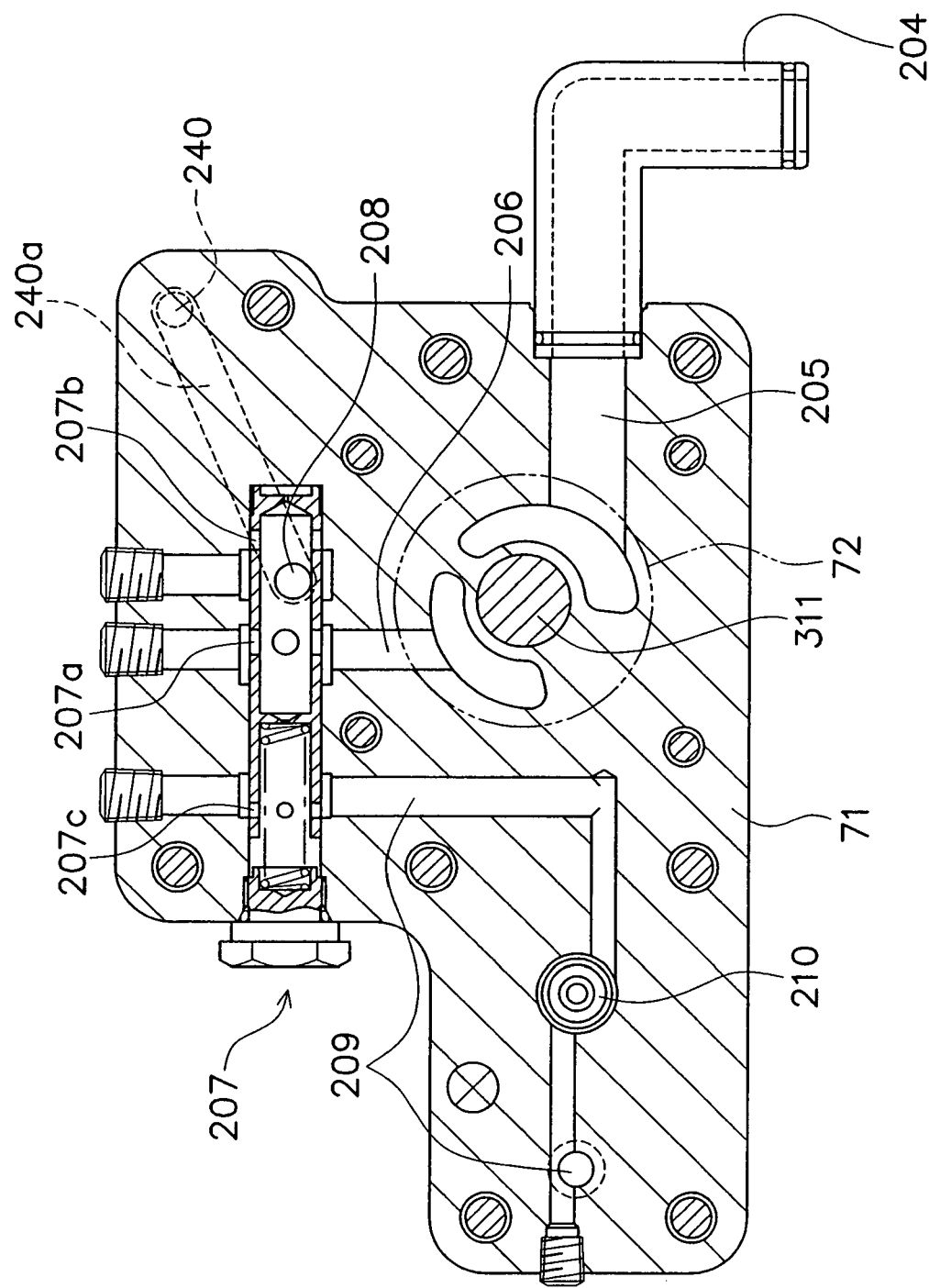
FIG. 10 is a cross section taken along a line X—X in FIG. 5.

FIG. 8 illustrates the hydraulic circuit of the vehicle 1. FIGS. 9 and 10 are respectively cross sections taken along lines IX—IX and X—X in FIG. 5.

Now, the hydraulic circuit, which uses pressurized hydraulic fluid as operating fluid fed from the charge pump unit 70.

As illustrated in FIG. 7, the tubular body 62 of the flywheel housing 61 forms first suction line 201 with a first end communicated with the hydraulic fluid chamber 62a and a second end opening to the outside of the tubular body 62. The second end of the first suction line 201 is communicated with a suction port of suction filter 202 provided in an outer circumference of the tubular body 62. A discharge port of the suction filter 202 is communicated with the charge pump unit 70 via second suction line 203 and conduit 204 (see FIGS. 8 and 10).

As illustrated in FIGS. 2, 5 and 10, the charge pump casing 71 forms third suction line 205 with a first end opening to the outside so as to be connected with the conduit 204 and a second end communicated with a suction port of the charge pump body 72, first discharge line 206 with a first end communicated with a discharge port of the charge pump body 72, flow divider 207 with portion 207a disposed so as to be communicated with a second end of the first discharge line 206, fourth discharge line 208 for communication between first output portion 207b of the flow divider 207 and a side of the charge pump casing, which faces the center section 350, PTO discharge line 209 with a first end communicated with second output portion 207c of the flow divider 207 and a second end opening through the side facing the center section 350, PTO on/off valve 210 placed in the PTO discharge line 209, and first PTO drain line 211 with a first end communicated with a drain portion of the PTO on/off valve 210 and a second end opening through the side facing the center section 350.

As illustrated in FIG. 9, the center section 350 forms the pair of hydraulic lines 220, first bypass line 221 for communication between the pair of hydraulic lines 220, charge line 222 with a first end opening through the second side 350b facing the charge pump casing 71 so as to be communicated with the fourth discharge line 208 and a second end connected with the first bypass line 221, charge relief valve 223 placed in the charge line 222, and a pair of high-pressure relief valves 224 and a pair of charge check valves 225 placed in the first bypass line 221 between a junction point with the charge line 222 and junction points respectively with the pair of hydraulic lines 220.

Preferably, the center section 350 additionally forms second bypass line 226 for communication between the pair of hydraulic lines 220, drain line 227 with a first end communicated with the second bypass line 226 and a second end communicated with a hydraulic fluid tank, a pair of suction valves placed in the second bypass line between a junction point with the drain line 227 and junction points respectively with the pair of hydraulic lines 220. The pair of suction valves 228 can effectively prevent a negative pressure from being caused in the pair of hydraulic lines 220, thereby preventing the vehicle from being accidentally moved downwardly on a sloping road (a free wheel phenomenon) when it is stopped with its engine stopped on the sloping road.

The center section 350 also forms a part of a hydraulic passage for controlling the hydraulic clutch unit 94 and/or the hydraulic brake unit 95 in the PTO unit 90. That is, as illustrated in FIGS. 5 and 9, the center section 350 further forms first PTO line 229 with a first end opening through the second side 350b facing the charge pump casing 71 so as to be communicated with the second end of the PTO discharge line 209 and a second end opening to the hydraulic fluid chamber 62b of the flywheel housing 61.

As illustrated in FIG. 5, the second end of the first PTO line 229 is communicated with the lid member 63b of the partition wall 63 in the flywheel housing 61 via hydraulic passage 230 in the form of such as a boring or any other suitable conduit formed in the flywheel housing 61.

Figure 11:
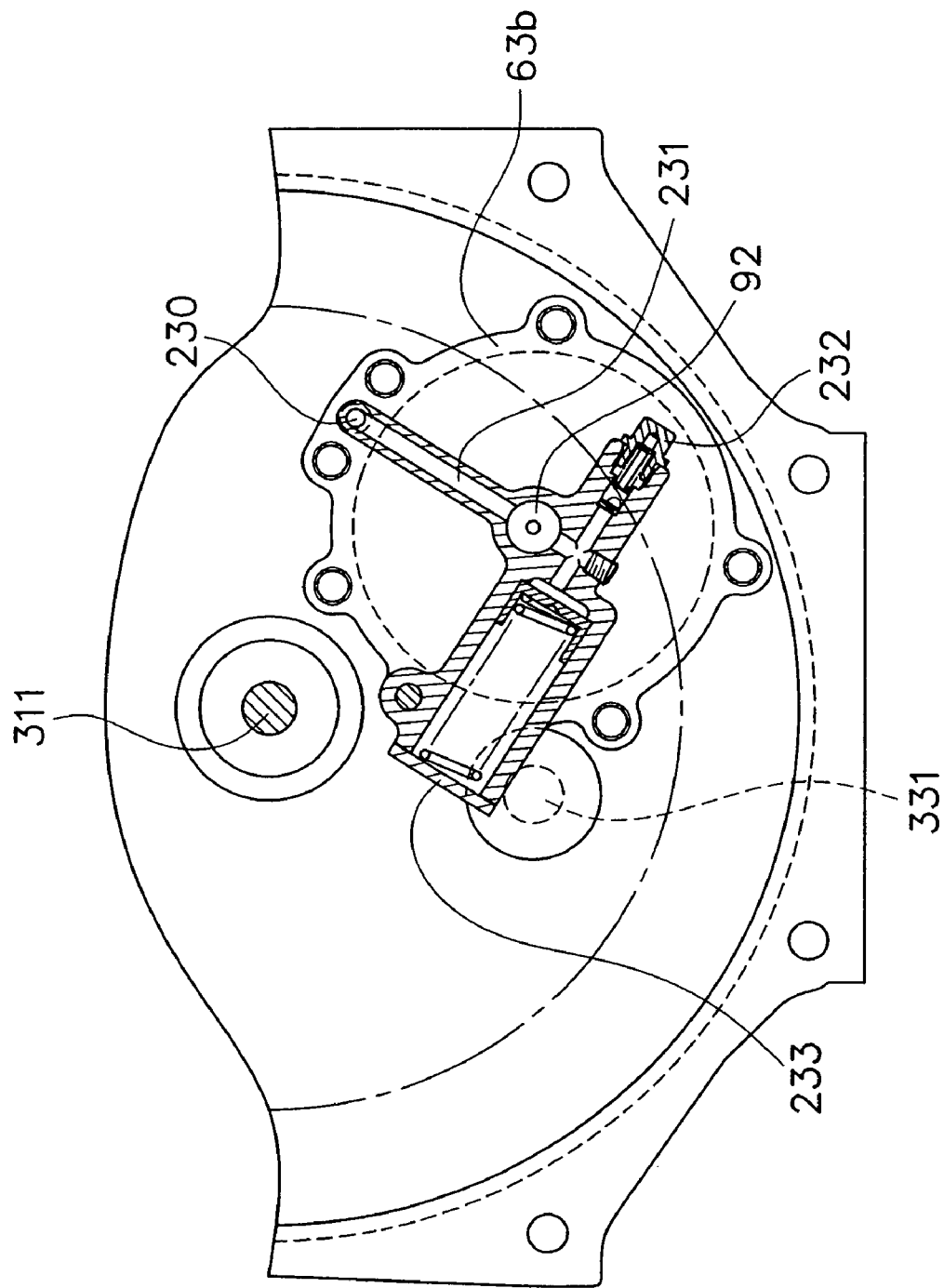
FIG. 11 is a cross section taken along a line XI—XI in FIG. 5.

FIG. 11 is across section taken along a line XI—XI in FIG. 5. As illustrated in FIG. 11, the lid member 63b is provided with second PTO line 231 with a first end communicated with the hydraulic passage 230 and a second end opening through a bearing surface of the PTO shaft 92, relief valve 232 placed in the second PTO line 231 for setting the working pressure of the hydraulic clutch unit 94, and accumulator 233 placed in the second PTO line 231 for gradual increase in fluid pressure fed to the hydraulic clutch unit 94.

As illustrated in FIG. 6, the PTO shaft 92 forms hydraulic passage 234 communicated with the second PTO line 231, so that pressurized hydraulic fluid fed from the second PTO line 231 via the hydraulic passage 234 is fed to the hydraulic clutch unit 94 and the hydraulic brake unit 95.

The center section 350 further forms a part of a hydraulic passage for an electric-controlled hydraulic servo mechanism as an output-adjusting-member control mechanism for controlling the slanting angle of the output adjusting member 314 in the HST 30. That is, the working vehicle of this embodiment employs electric-controlled hydraulic servo mechanism 500 as the output-adjusting-member control mechanism, which is designed to use a part of pressurized hydraulic fluid from the charge pump unit 70 as operating fluid.

Now, the description will be made for the electric-controlled hydraulic servo mechanism 500.

The electric-controlled hydraulic servo mechanism 500 is designed to be capable of slantingly moving the output adjusting member 314 by rotating an outer extension of the control shaft 315 by an effect of hydraulic pressure.

Figure 12:
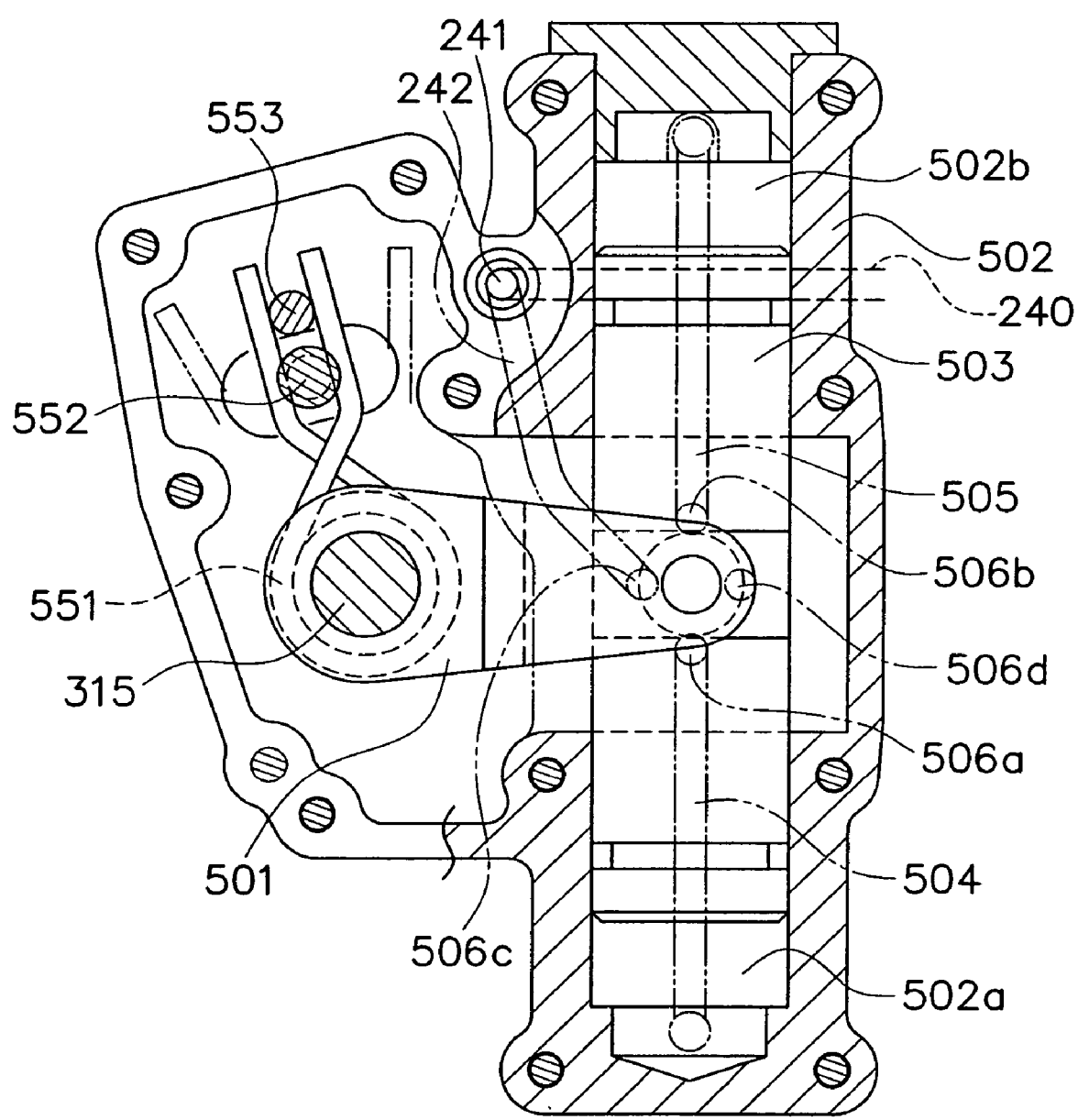
FIG. 12 is a cross section taken along a line XII—XII in FIG. 5.

FIG. 12 is a cross section taken along a line XII—XII in FIG. 5.

As illustrated in FIGS. 5 and 12, the electric-controlled hydraulic servo mechanism 500 includes pivoting arm 501 with a first end relatively non-rotatably connected with the control shaft 315 and a second end that is a free end crossing the control shaft 315, cylinder block 502 having a piston accommodation space of a linear shape, cover 502c attached on an outer side wall of the cylinder block 502, piston 503 fluid-tightly and axially slidably placed within the piston accommodation space so as to divide the piston accommodation space into first hydraulic fluid chamber 502a and second hydraulic fluid chamber 502b, first hydraulic line 504 with a first end communicated with the first hydraulic fluid chamber 502a and a second end formed in a joint surface between the cylinder block 502 and the cover 502c so as to open to the outside, second hydraulic line 505 with a first end communicated with the second hydraulic fluid chamber 502b and a second end formed in a joint surface between the cylinder block 502 and the cover 502c so as to open to the outside, and electromagnetic switching valve (servo valve) 506 disposed on the cover 502c with first and second output ports 506a, 506b formed on an output side respectively communicated with the second ends of the first and second hydraulic lines 504, 505 and with input port 506C and drain port 506d formed on an input side.

In association with the operation of the operation member such as a shift lever disposed near the driver seat, the electromagnetic switching valve 506 takes a first position enabling communication of the first output port 506a with the input port 506c and communication of the second output port 506b with the drain port 506d, a center holding position for shutoff of the respective ports, and a second position enabling communication of the second output port 506b with the input port 506c and communication of the first output port 506a with the drain port 506d.

In this embodiment, as operating fluid for the hydraulic servo mechanism, pressurized hydraulic fluid from the charge pump 70 is utilized.

Specifically, the center section 350 forms servo line 240 with a first end opening through the second side 350b of the center section 350 facing the charge pump casing 71 so as to be communicated with the fourth discharge line 208 (see FIG. 9). In this embodiment, the second side 350b of the center section 350 facing the charge pump casing 71 forms groove 240a for communication between the charge line 222 and the servo line 240, so that a part of pressurized hydraulic fluid coming from the fourth discharge line 208 via the groove 240a flows into the servo line 240.

A second end of the servo line 240 is communicated with the input port 506c of the servo valve 506 via hydraulic passage 241 (see FIG. 7) formed in a peripheral wall of the flywheel housing 61 and hydraulic passage 242 formed in the cylinder block 502.

The thus arranged hydraulic servo mechanism 500 is actuated in the following manner.

First, the driver operates the operation member to enable a controller (not shown) to excite one solenoid coil of the electromagnetic switching valve 506 in association with the operation of the operation member. The actuated electromagnetic switching valve 506 enables pressurized hydraulic fluid to be fed into either the first or second hydraulic fluid chamber 502a, 502b while being discharged from the residual chamber. Accordingly, the piston 503 is moved towards either side in the axial direction. Once the piston 503 moves to either side of the axial direction, the pivoting arm 501 is pivoted so that the control shaft 315 is rotated around the axis, thereby slantingly moving the output adjusting member 314. Upon stoppage of the operation member by the driver, the controller (not shown) turns off electricity to the solenoid coil so that the electromagnetic switching valve 506 returns to the holding position. Thus, the slanting movement of the output adjusting member 314 is halted.

As described above, in this embodiment, the output adjusting member 314 of the HST 30 serving as the main-speed-change unit is so arranged as to be operated by the electric-controlled hydraulic servo mechanism 500. Therefore, this arrangement achieves a simplified structure as compared with an arrangement with the operation member connected with the output adjusting member of the HST via a mechanical operation mechanism such as a linking mechanism or wire mechanism.

That is, as described above, the HST 30 is allowed to vibrate freely relative to the vehicle frame 10. Therefore, if the mechanical operation mechanism connects the operation member of such as the driver seat, which is fixed in position so as not to vibrate relative to the vehicle frame 10, with the output adjusting member 314 of the HST 30, vibrations of the HST 30 relative to the vehicle frame 10 must be absorbed within the mechanical operation mechanism. This results in complicated structure of the mechanical operation mechanism.

On the contrary, in this embodiment, only the necessary matter is to provide a wire connection of the electromagnetic switching valve 506 with the controller (not shown). As a result, a connection mechanism between the operation member and the output adjusting member 314 of the HST 30 can be simplified.

The electric-controlled hydraulic servo mechanism 500 serving as the output-adjusting-member control mechanism is preferably provided with neutral-position-return-assist mechanism 550 for biasing the output adjusting member 314 to the neutral position.

The neutral-position-return-assist mechanism 550 includes torsion spring 551 supported around the outer extension of the control shaft 315, and locking pin 552 which lies at a reference position during the output adjusting member 314 lies at the neutral position, and upon the slanting movement of the output adjusting member 314 in directions respectively enabling the vehicle to move forward and rearward (i.e., vehicle forward direction and vehicle backward direction), pivots around the axis of the control shaft 315 by a displacement amount corresponding to the slanting angle of the output adjusting member 314.

In this embodiment, the locking pin 552 has a proximal end connected with the output adjusting member 314 and a distal end extending to the outside of the flywheel housing 61, while the torsion spring 551 has first and second free ends positioned on the opposite sides of the outer extension in the pivoting direction.

With the above arrangement, the locking pin 552 presses the first and second ends of the torsion spring 551, respectively, against the biasing force of the spring 551 when the output adjusting member 314 pivots in the vehicle forward and rearward directions.

The neutral-position-return-assist mechanism 550 further includes a fixing member for fixing the first and second ends of the torsion spring 551 in position, respectively, when the locking pin 552 pivots in the vehicle forward and backward directions. That is, the fixing member limits movement of the second end of the torsion spring 551 when the locking pin 552 presses the first end of the torsion spring 551, and limits movement of the first end of the torsion spring 551 when the locking pin 552 presses the second end of the torsion spring 551. In this embodiment, fixing pin 553 supported by the cover 502c serves as the fixing member.

The fixing pin 553 is preferably an eccentric pin, which has body 553a interposed between the opposite ends of the torsion spring 551 and eccentric portion 553b having an axis eccentric to the body 553a and extending to the outside through the cover 502c. With this arrangement, rotation of the eccentric portion 553b around the axis enables the body 553a to change its position relative to the control shaft 315, and hence the neutral position of the output adjusting member 314 can be easily adjusted after assembling the HST.

In this embodiment, pressurized hydraulic fluid from the charge pump unit 70 is thus used not only as fluid replenished to the pair of charge lines 220, but also as operating fluid for driving the output adjusting member, and operating fluid for driving the hydraulic clutch unit and the hydraulic brake unit in the PTO unit.

Now, the description will be made for a hydraulic circuit, in which hydraulic pressurized fluid fed from the auxiliary pump unit 80 is used as operating fluid.

The auxiliary pump casing 81 forms suction line 251 with a first end opening to the outside and a second end communicated with a suction port of the auxiliary pump body 82, and discharge line 252 with a first end communicated with a discharge port of the auxiliary pump body 82 and a second end opening to the outside (see FIG. 8).

The first end of the suction line 251 is communicated via flexible conduit 260 such as a rubber tube with auxiliary hydraulic fluid tank 280 secured on the vehicle frame 10. The second end of the discharge line 252 is communicated via flexible conduit 261 such as a rubber tube with power-steering hydraulic circuit 291 and/or outside-unit-driving hydraulic circuit 292.

The utilization of the flexible conduits 260, 261 as suction and discharge conduits of the auxiliary pump unit 80 is due to the reason mentioned below.

That is, the auxiliary pump unit 80 is supported by the vibratory unit constituted by the integral connection of the engine 20, the flywheel 60 and the HST. The vibratory unit vibrates freely relative to the vehicle frame 10, as described above, and therefore the auxiliary pump unit 80 also vibrates freely relative to the vehicle frame 10.

On the other hand, the auxiliary hydraulic fluid tank 280, as well as the power-steering hydraulic circuit 291 and/or the outside-unit-driving hydraulic circuit 292 are fixed so as not to vibrate relative to the vehicle frame 10.

Accordingly, if the suction and discharge conduits of the auxiliary pump unit 80 are formed from rigid conduits, there may cause twisting of the rigid conduits and hence invite leakage of operating fluid. In light of this, the flexible conduits 260, 261 are used as the suction conduit and discharge conduit of the auxiliary pump unit 80.

Oil cooler 265 is placed in conduit 263, through which return fluid from the power-steering hydraulic circuit 291 and/or the outside-unit-driving hydraulic circuit 292 flows. The oil cooler 265 has secondary conduit 263 which is a flexible conduit, and passes through the inside of the hydraulic fluid chamber 62b of the flywheel housing 61 so as to cool operating fluid stored therein. Operating fluid overflowing from the hydraulic fluid chamber 62b is finally returned to the auxiliary hydraulic fluid tank 280 via flexible conduit 264.

Second Embodiment

Figure 13:
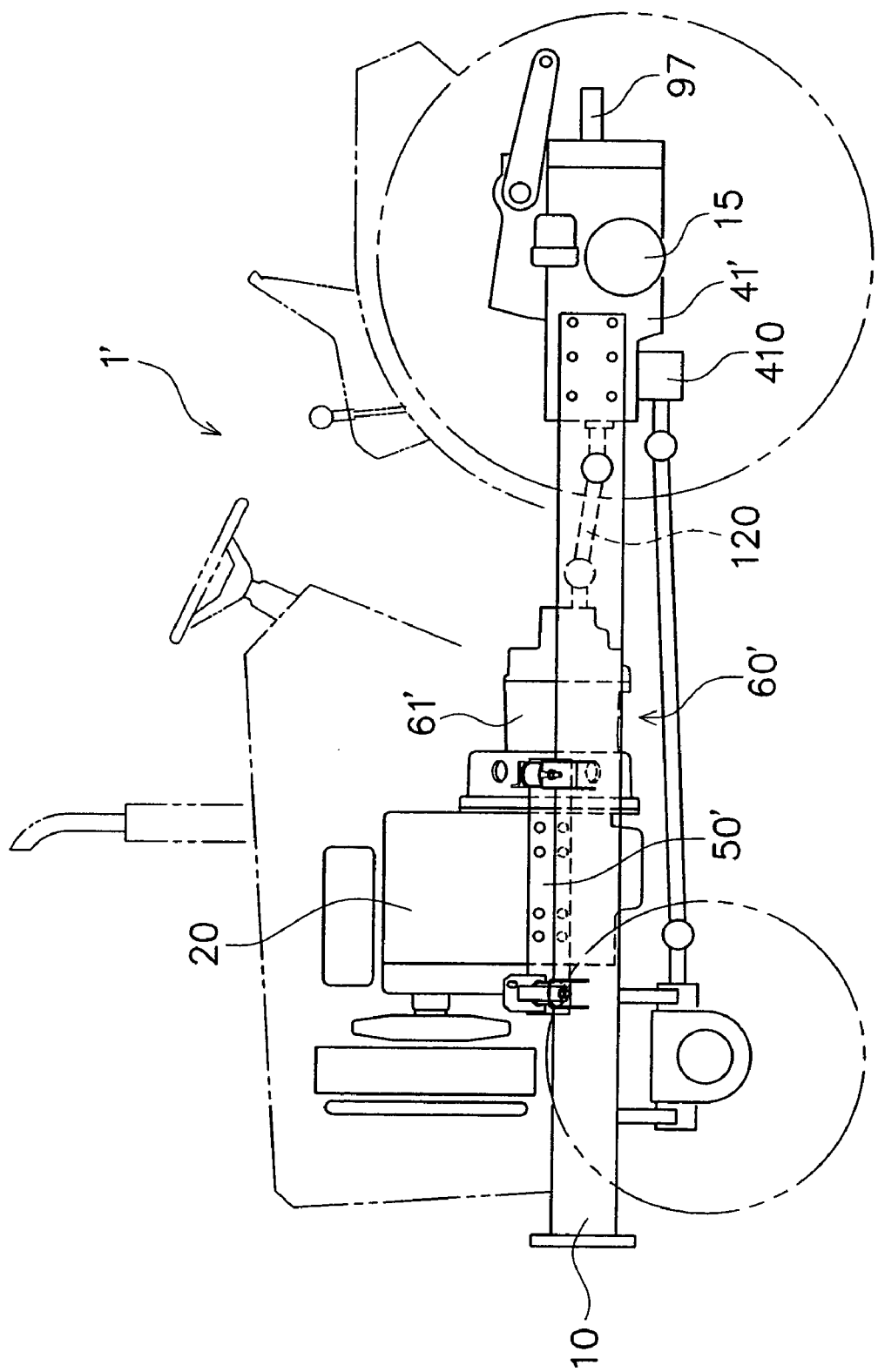
FIG. 13 is a schematic side view of a working vehicle according to a second embodiment of the present invention.
Figure 14:
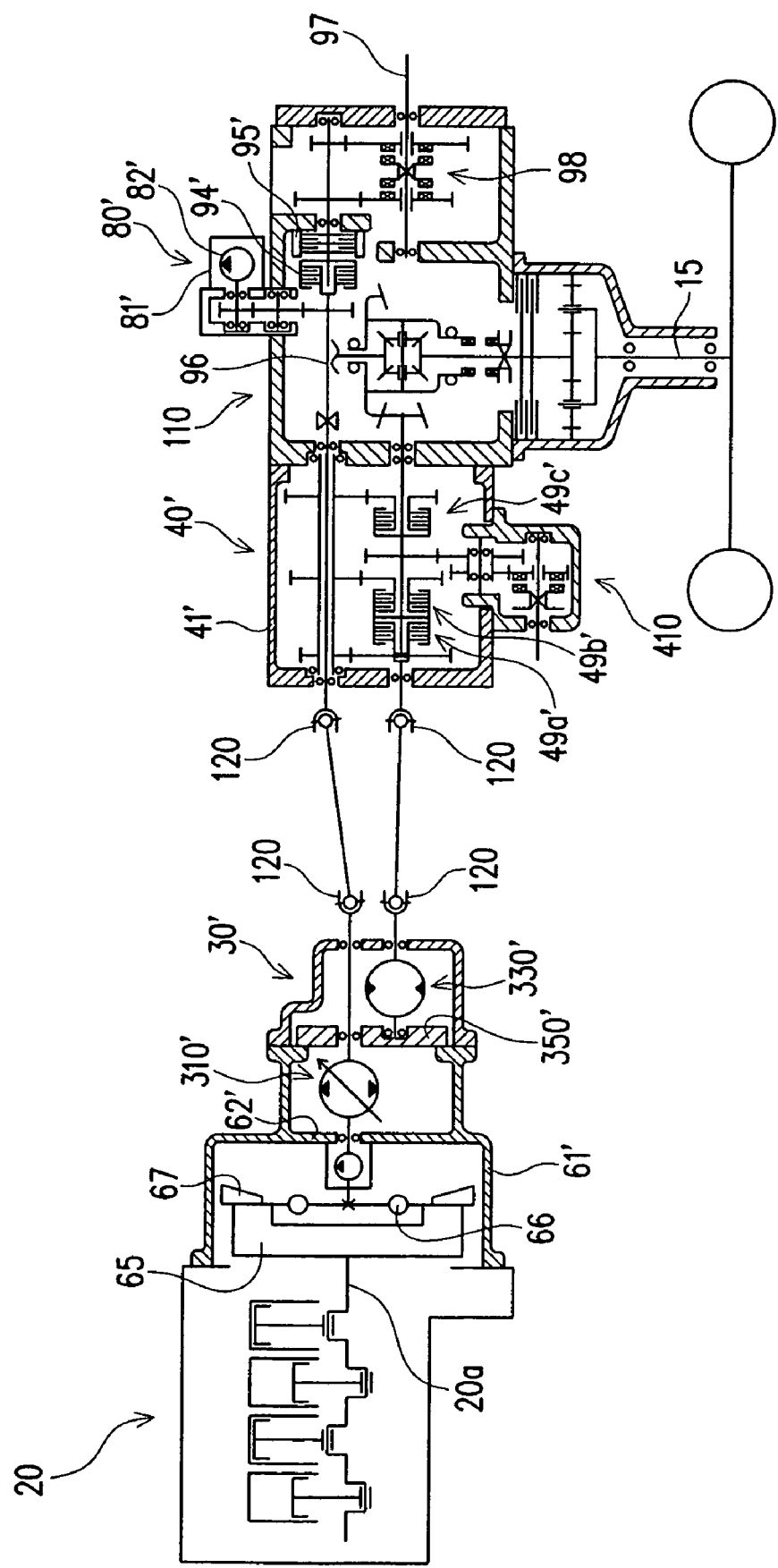
FIG. 14 is a model view illustrating power transmission of the working vehicle of FIG. 13.
Figure 15:
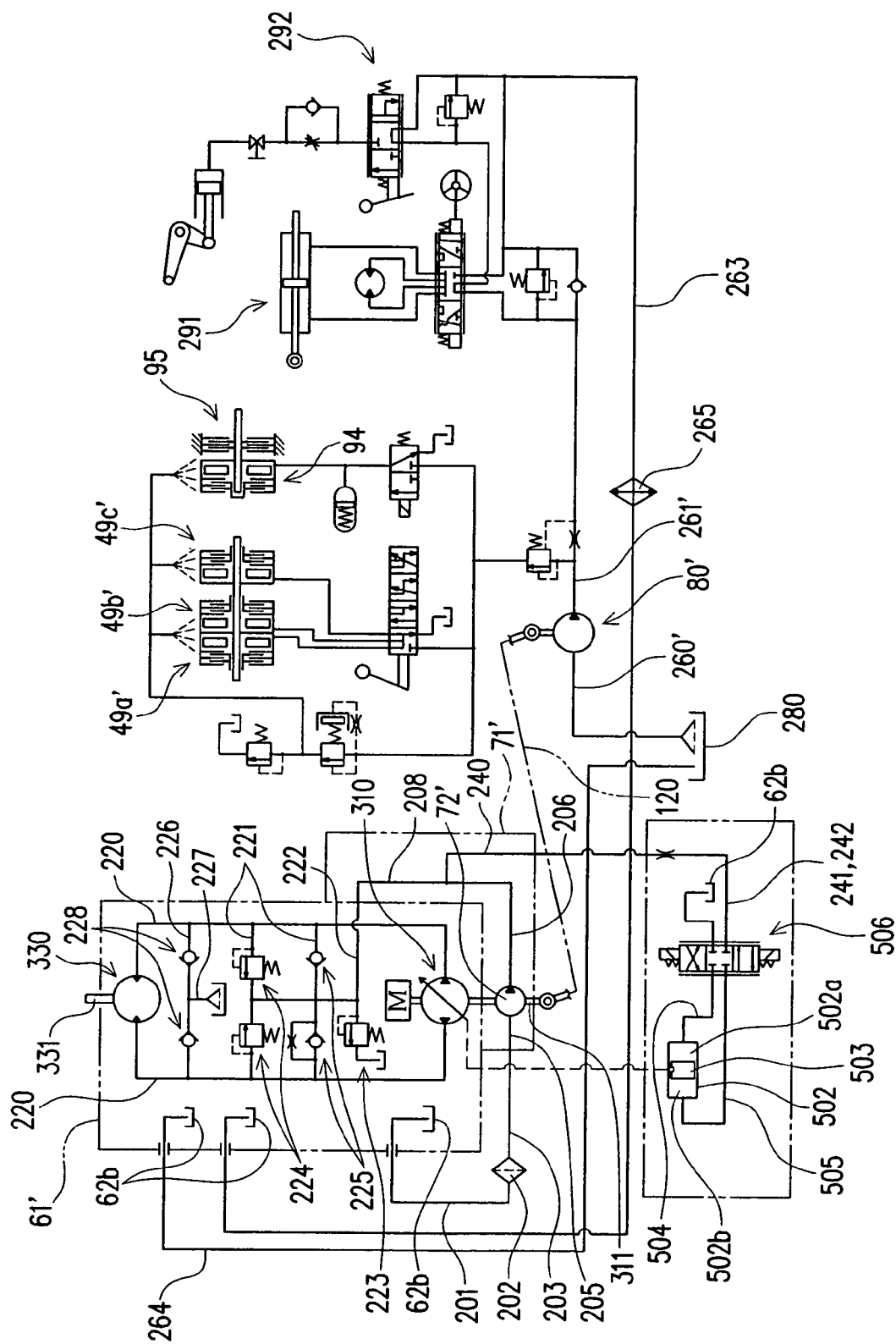
FIG. 15 is a hydraulic circuit diagram of the working vehicle of FIG. 13.

Now, the description will be made for the second embodiment of the present invention with reference to the accompanied drawings. FIGS. 13–15 are respectively schematic side view of working vehicle 1', a model view of power transmission of the working vehicle, and hydraulic circuit diagram of the same. In the following description, corresponding or identical parts to those of the first embodiment have been given the same reference characters or those with primes to omit a detailed description thereof.

The working vehicle 1' of this embodiment is different from the working vehicle 1 of the first embodiment in the following points:

(i) The hydraulic pump and the hydraulic motor unit are respectively supported on the side facing the center section;

(ii) The charge pump unit is supported on the partition wall of the flywheel housing on the upstream side of the hydraulic pump unit in the power transmission direction;

(iii) The downstream end of the pump shaft in the hydraulic pump unit is used as a PTO shaft;

(iv) The auxiliary pump unit is supported on the fixed unit; and (v) The hydraulic clutch unit and the hydraulic brake unit, as well as the sub-speed-change unit are accommodated within the transmission housing.

Figure 16:
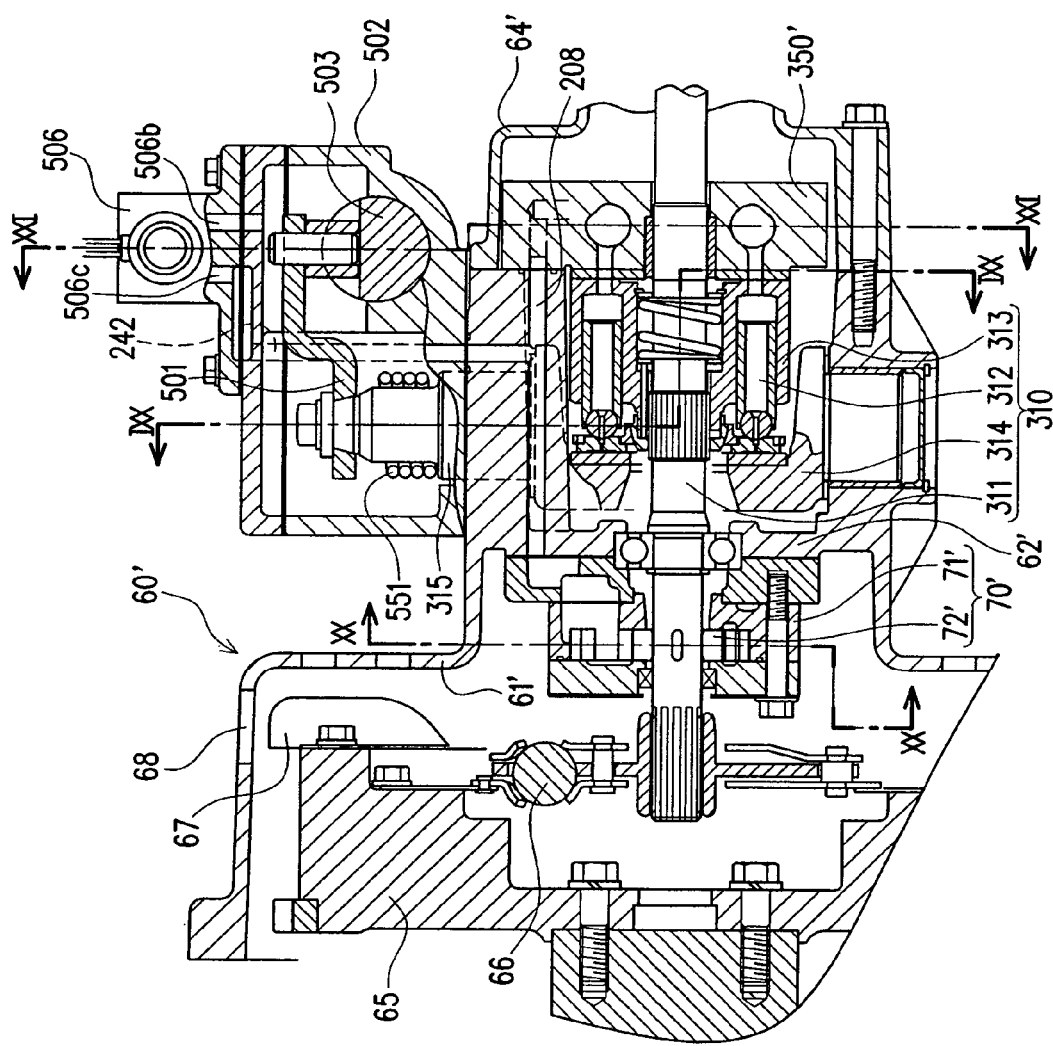
FIG. 16 is a plan view of an HST and its vicinity in lateral cross section in the working vehicle of FIG. 13.
Figure 17:
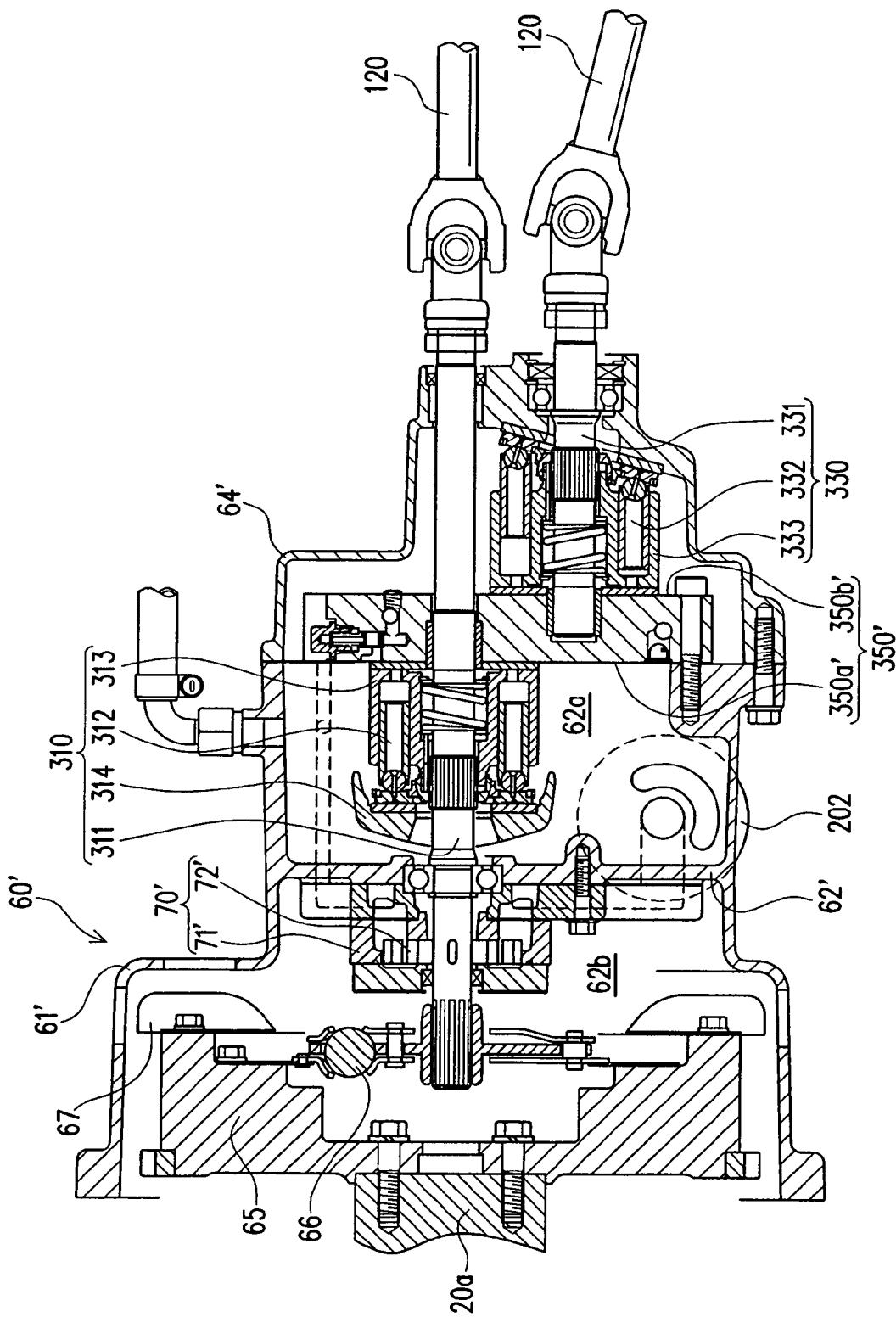
FIG. 17 is a side view of the HST and its vicinity in longitudinal cross section in the working vehicle of FIG. 13.

FIGS. 16 and 17 are respectively a plan view in lateral cross section and a side view in longitudinal cross section of HST 30' and its vicinity.

The HST 30' includes the hydraulic pump unit 310, the hydraulic motor unit 330, center section 350' for supporting the hydraulic pump unit 310 and the hydraulic motor unit 330.

The center section 350' has first side 350a' facing upstream, which supports the hydraulic pump unit 310 thereon, and second side 350b' facing downstream, which supports the hydraulic motor unit 330 thereon. That is, in this embodiment, the hydraulic pump unit 310 and the hydraulic motor unit 330 are respectively supported on the first and second sides 350a', 350b' of the center section 350', thereby allowing the pump shaft 311 and the pump shaft 311 to be positioned as close as possible to each other, achieving further downsizing of the HST.

The HST 30' is supported on flywheel housing 61' in a free state (i.e., without direct engagement) with respect to the vehicle frame. That is, the HST 30', as well as the engine 20 and the flywheel 60' are integrally connected together so as to constitute a vibratory unit that vibrates freely relative to the vehicle frame 10.

More specifically, the flywheel 60' in this embodiment includes the flywheel housing 61', which has tubular body 62' similar to the tubular body 62. The tubular body 62' is so designed as to be connected with the center section 350' with the hydraulic pump unit 310 and the hydraulic motor unit 330 supported thereon.

Figure 18:
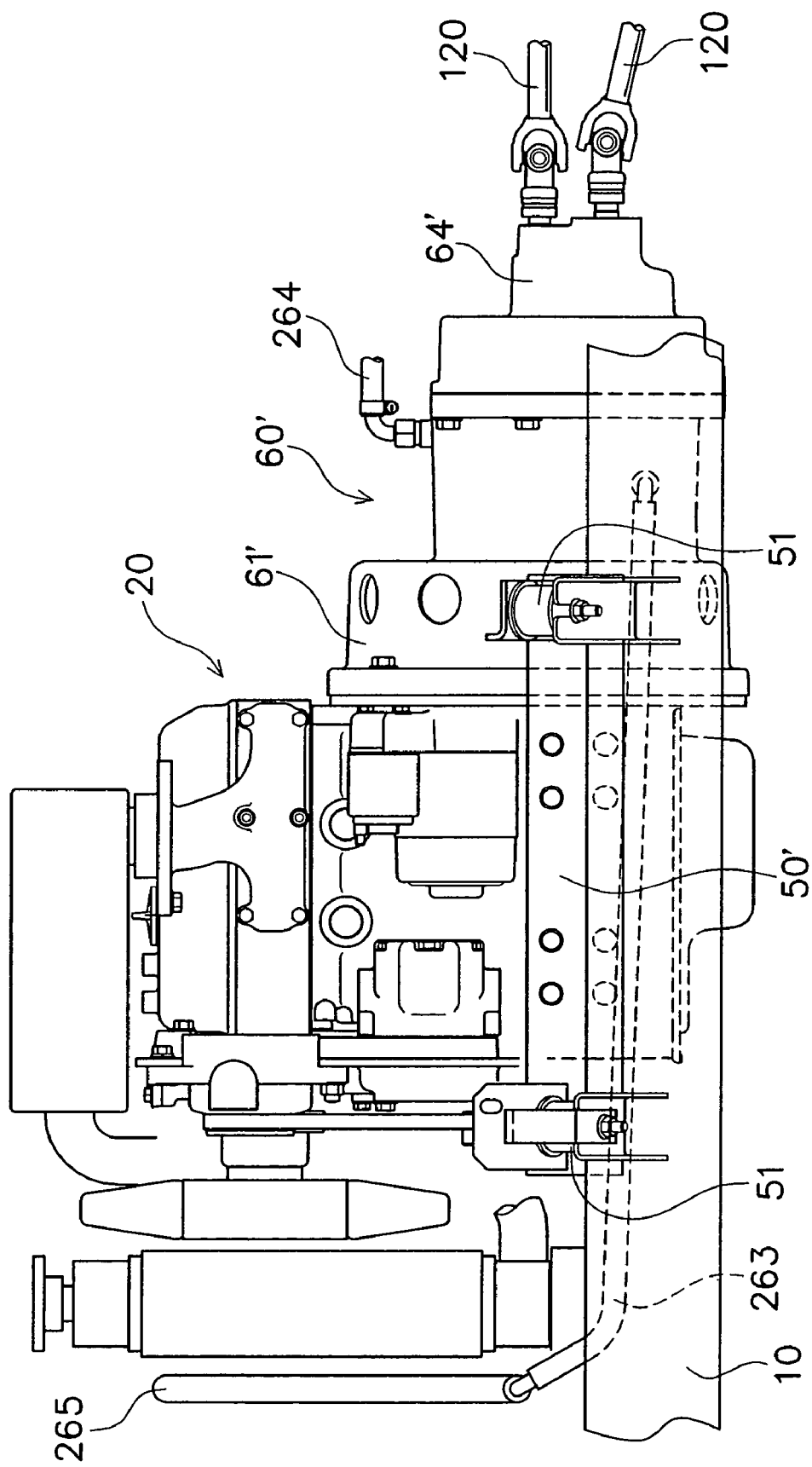
FIG. 18 is an enlarged side view of an engine and its vicinity in the working vehicle of FIG. 13.

The flywheel housing 6 V is further provided with the cover 64', which encloses the hydraulic pump unit 310, the hydraulic motor unit 330, and the center section 350', in which the center section 350' is connected with the tubular body 62' while supporting thereon the hydraulic pump unit 310 and the hydraulic motor unit 330. That is, in this embodiment, partition wall 63 of the tubular body 62' and the cover 64' together define the hydraulic fluid chamber 62b. The fly-Wheel housing 61' of this embodiment uses attaching bracket 50' which has a length extending between the engine 20 and the flywheel housing 61', since the longitudinal length of the vehicle is elongated as compared with the first embodiment (see FIG. 18).

In this embodiment, charge pump unit 70' is supported on the partition wall 63 so as to be positioned within the dry chamber 62a. This arrangement allows the pump shaft 311 and the motor shaft 331 to be positioned as close as possible to each other. That is, in this embodiment, the hydraulic pump unit 310 and the hydraulic motor unit 330 are respectively supported on the first and second sides 350a', 350b' of the center section 350' so as to achieve minimized the shaft distance between the pump shaft 311 and the motor shaft 331. In the case of this arrangement, if the charge pump unit 70' is supported on the second side 350b' of the center section 350 or the cover 64', the pump shaft 311 and the motor shaft 331 must be spaced apart from each other so as to prevent intervention between the charge pump unit 70' and the motor shaft 331.

On the contrary, in this embodiment, the charge pump unit 70' is supported on the partition wall 63 on the upstream side of the hydraulic pump unit 310, so that no consideration to prevent intervention between the charge pump unit 70' and the hydraulic motor unit 330 may be needed. Therefore, it is possible to achieve minimized distance between the pump shaft 311 and the motor shaft 331.

In this embodiment, the downstream end of the pump shaft 311 is used as the PTO shaft, thereby achieving simplified structure of the PTO unit 90.

That is, in this embodiment, as described above, the charge pump unit 70' is not disposed on the downstream end of the pump shaft 311, but on the upstream side of the hydraulic pump unit 310. Accordingly, the thing to do for using the pump shaft 311 as the PTO shaft is only to have the downstream end of the pump shaft 311 extending downstream through the center section 350' and the cover 64'.

As illustrated in FIG. 14, the downstream end of the pump shaft 311 is operatively coupled with the power transmission shaft 96 via the vibration-absorbing shaft coupling 12O. In this embodiment, PTO clutch unit 94' and PTO brake unit 95' are provided in the fixed unit. Specifically, the PTO clutch unit 94' and the PTO brake unit 95' are disposed on the power transmission shaft 96 within transmission housing 41'.

In this embodiment, the auxiliary pump unit 80' is disposed on the downstream side of the vibration-absorbing shaft coupling 120. That is, the auxiliary pump unit 80' is supported by the fixed unit disposed with a distance from the vibratory unit constituted by the engine 20, the flywheel 60' and the HST 30' so as not to vibrate relative to the vehicle frame.

Specifically, the auxiliary pump unit 80' Includes auxiliary pump casing 81' secured to the transmission housing 41', auxiliary pump body 82' enclosed by the auxiliary pump casing 81', and a power transmission mechanism for providing constant connection between the auxiliary pump body 82' and the power transmission shaft 96 located on the upstream side of the PTO clutch unit 94'.

Now, the description will be made for the hydraulic circuit of the working vehicle of this embodiment with reference to FIG. 15.

Pressurized hydraulic fluid from the charge pump unit 70' Is fed to the charge line 222 as charging fluid, as well as fed to the servo line 240.

Figure 19:
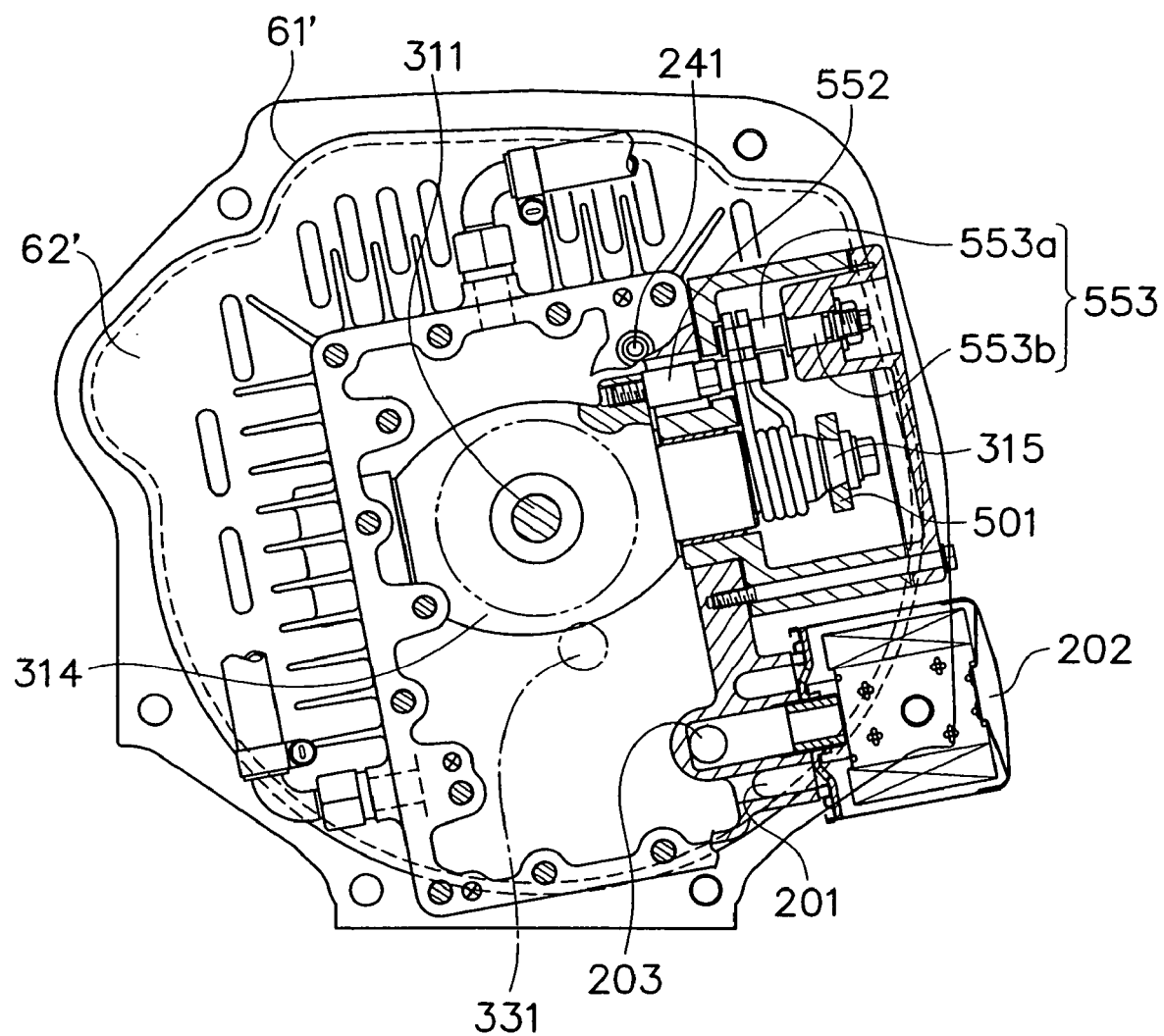
FIG. 19 is a cross section taken along a line IXX—IXX in FIG. 16.
Figure 20:
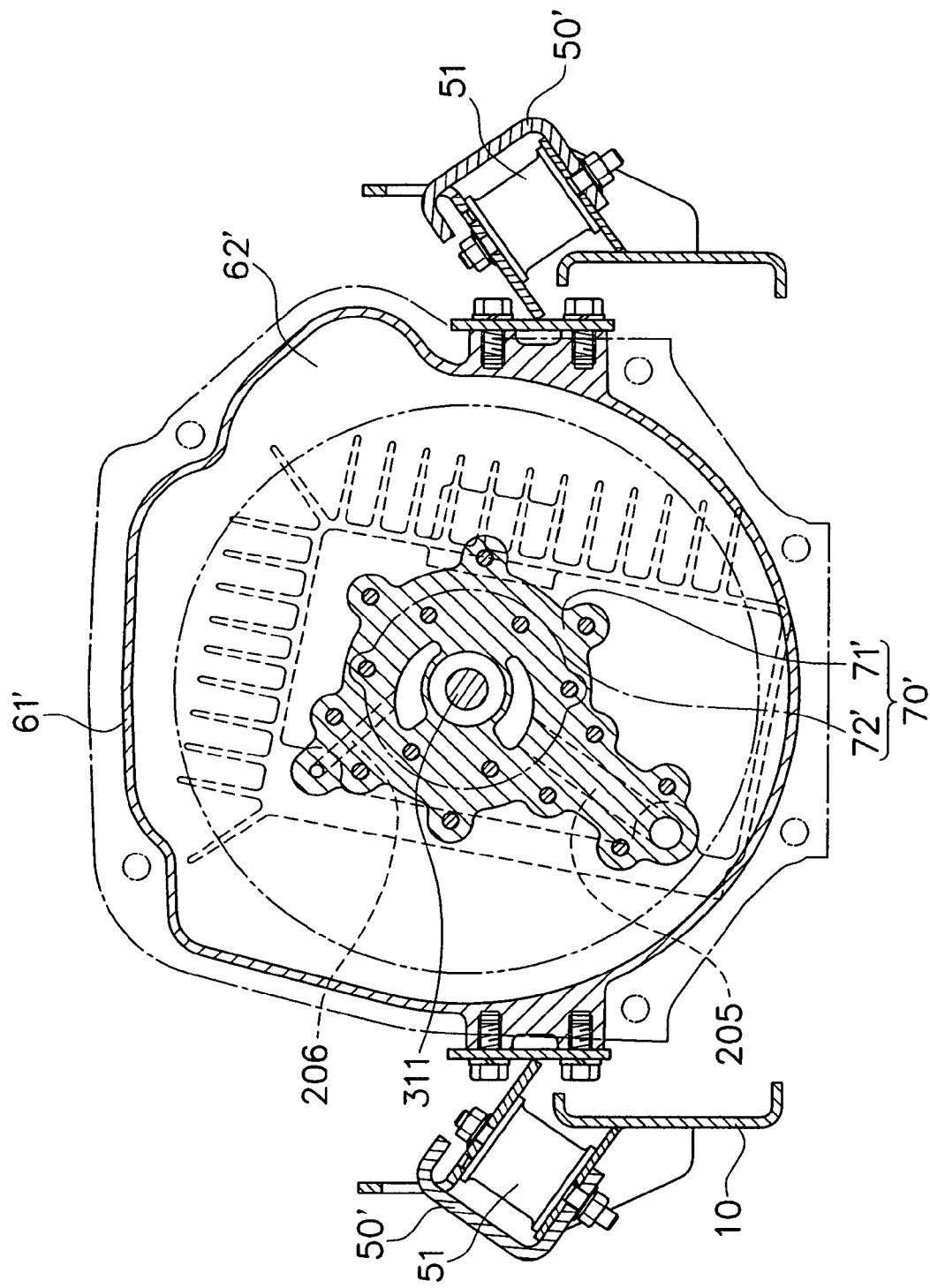
FIG. 20 is a cross section taken along a line XX—XX in FIG. 16.
Figure 21:
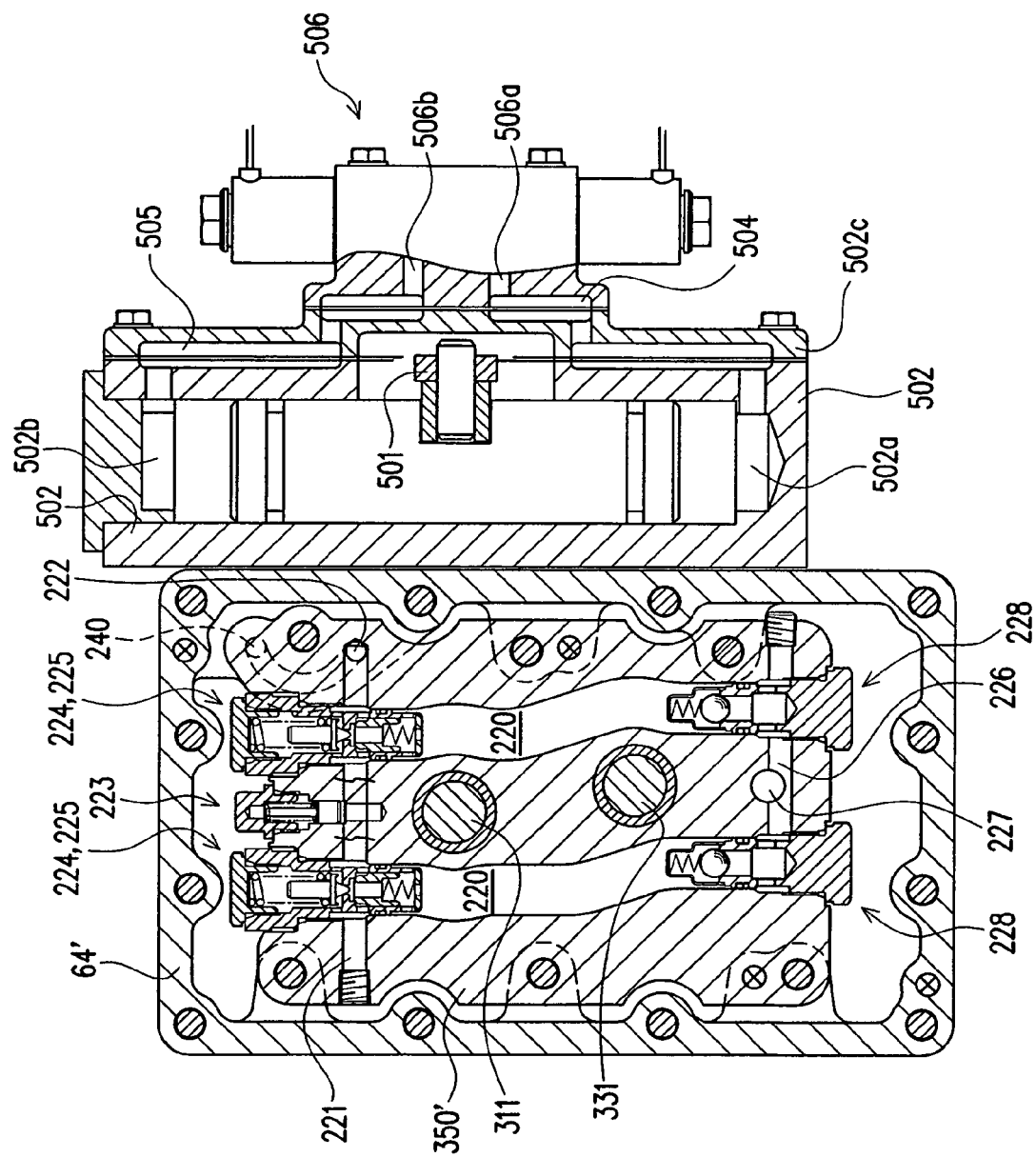
FIG. 21 is a cross section taken along a line XXI—XXI in FIG. 16.
Figure 22:
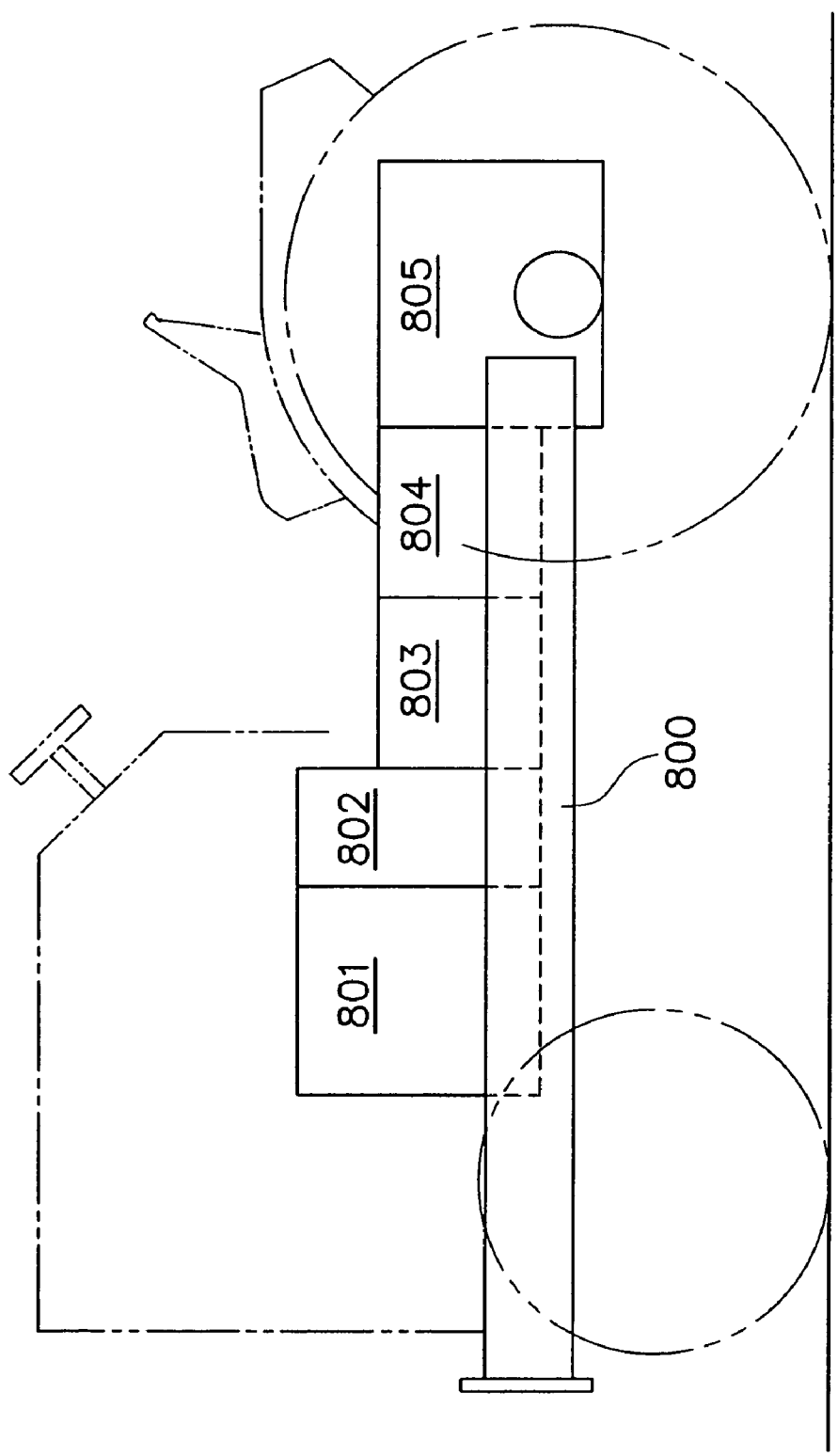
FIG. 22 is a schematic side view of a conventional working vehicle.

FIGS. 19–21 are respectively cross sections taken along lines IXX-IY-X to XXI—XXI in FIG. 16.

As illustrated in FIG. 19, the tubular body 62' is connected with the suction filter 202, and forms the first suction line 201 for communication between the hydraulic fluid chamber 62b and the suction port of the suction filter 202, and the second suction line 203 for communication between the discharge port of the suction filter 202 and the charge pump.

As illustrated in FIG. 20, the charge pump casing 71' of the charge pump 70' forms the third suction line 205 for communication between the second suction line 203 and the suction port of the charge pump body 72', and the first discharge line 206 with the first end communicated with the discharge port of the charge pump body 72'.

As illustrated in FIG. 16, the tubular body 62' further forms the fourth discharge line 208 for communication between the first discharge line 206 and the charge line 222 in the center section 350', and hydraulic passage 242 branched from the fourth discharge line 208 and communicated with the input port 506c of the servo valve 506.

As illustrated in FIG. 21, the center section 350' forms a hydraulic passage in the same manner as the center section 350 of the first embodiment.

Thus, in this embodiment, pressurized hydraulic fluid from the charge pump unit 70' is used as replenishing fluid to the pair of charge tines 220 and operating fluid driving the servo valve 506.

On the other hand, as illustrated in FIG. 15, pressurized hydraulic fluid from the auxiliary pump unit 80' is used as operating fluid for the hydraulic clutch of the multi-speed mechanical transmission, as well as operating fluid for the hydraulic clutch unit 94 and/or the hydraulic brake unit 95 in the PTO unit, operating fluid for the power steering and operating fluid for driving the outside unit.

That is, as illustrated in FIGS. 15 and 16, in this embodiment, multi-speed mechanical transmission 40' serving as the sub-speed-change unit includes hydraulic clutch units 49a'–49c' to change the speed by utilizing a part of pressurized hydraulic fluid from the auxiliary pump 80'.

In this embodiment, it is possible to achieve cost reduction of conduit members in the auxiliary pump unit, as well as producing the same desirable effects as the first embodiment.

That is, the auxiliary pump unit 80' of this embodiment is supported by the fixed unit disposed with a distance from the vibratory unit constituted by the engine 20, the flywheel 60' and the HST 30', and operatively coupled with the pump shaft 311 of the fixed unit via the vibration-absorbing shaft coupling 120. This arrangement omits the necessity to form suction conduit 260' and discharge conduit 261' in the auxiliary pump unit 80' by flexible conduits, enabling further cost reduction of the conduit members as compared with the first embodiment. Also, durability of the conduits can be improved thanks to non-transmission of vibrations from the engine and/or the HST to the suction conduits, discharge conduits or the like.

This specification is by no means intended to restrict the present invention to the preferred embodiments set forth therein. Various modifications to the transmission for the working vehicle, and the vehicle as described herein, may be made by those skilled in the art without departing from the spirit and scope of the present invention as defined in the appended claims.

What is claimed is:

1. A working vehicle comprising:
   an engine supported by a vehicle frame;
   a flywheel operatively connected with said engine;
   an HST operatively connected with said flywheel, wherein, said flywheel and said HST are integrally connected with said engine in a free state with respect to the vehicle frame so as to be capable of vibrating integrally with said engine; and
   a transmission which is disposed at a distance from said engine along a vehicle's longitudinal direction and is fixedly supported by the vehicle frame, said transmission including a sub-speed change unit;
   wherein an output shaft of said HST is operatively coupled with an input shaft of said transmission via a vibration-absorbing shaft coupling so as to absorb relative vibrations between said HST and said transmission.

2. A working vehicle according to claim 1, wherein said transmission further comprises:
   a PTO shaft for outputting rotational output in synchronization with rotational output of said engine; and
   a motor shaft for outputting rotational output which is variable relative to rotational output of said engine.

3. A working vehicle according to claim 1, further comprising:
   a housing connected with said engine in a free state with respect to the vehicle frame so as to surround said HST;
   wherein said housing includes a chamber for accommodating said HST, said chamber being constructed to be capable of storing oil.

4. A working vehicle according to claim 3, further comprising:
   an airflow fan rotated integrally with said flywheel.

* * * * *